US005861726A

United States Patent [19]

Uchikata et al.

[11] Patent Number: 5,861,726

[45] Date of Patent: Jan. 19, 1999

[54] RECORDING APPARATUS WITH A STEP MOTOR CONTROLLING MECHANISM

[75] Inventors: Yoshio Uchikata; Koh Hasegawa; Toshihide Wada; Tadashi Hanabusa, all of Yokohama, Japan

[73] Assignee: Canon Kabushiki Kaisha, Tokyo, Japan

[21] Appl. No.: 731,175

[22] Filed: Oct. 7, 1996

Related U.S. Application Data

[63] Continuation of Ser. No. 181,532, Jan. 14, 1994, abandoned.

[30] Foreign Application Priority Data

| | | | |
|---|---|---|---|
| Jan. 19, 1993 | [JP] | Japan | 5-007048 |
| Jan. 19, 1993 | [JP] | Japan | 5-007049 |
| Jan. 19, 1993 | [JP] | Japan | 5-007050 |

[51] Int. Cl.[6] .......... G05B 19/40

[52] U.S. Cl. .......... 318/685; 318/603; 347/37; 400/903; 400/322

[58] Field of Search .......... 318/685, 696, 318/259, 560–561, 567, 569–571, 590, 592, 594, 596, 599, 600–603; 347/37–39, 166–168, 234, 248; 400/163, 902, 903, 319–336.1

[56] References Cited

U.S. PATENT DOCUMENTS

| | | | |
|---|---|---|---|
| 3,370,289 | 2/1968 | Hedgcock et al. . | |
| 3,378,741 | 4/1968 | Sutton . | |
| 3,493,827 | 2/1970 | Tinkler . | |
| 3,566,239 | 2/1971 | Taniguchi | 318/593 |
| 3,668,500 | 6/1972 | Kasem | 318/594 X |
| 3,731,177 | 5/1973 | Commander et al. | 318/594 X |
| 3,802,622 | 4/1974 | Nishimura et al. | 318/591 X |
| 3,986,091 | 10/1976 | Quiogue et al. | 318/594 |
| 4,297,624 | 10/1981 | Komiya | 318/594 |
| 4,313,124 | 1/1982 | Hara . | |
| 4,345,262 | 8/1982 | Shirato et al. . | |
| 4,349,770 | 9/1982 | Ragen | 318/653 X |
| 4,459,600 | 7/1984 | Sato et al. . | |
| 4,463,359 | 7/1984 | Ayata et al. . | |
| 4,511,907 | 4/1985 | Fukuchi | 346/140 R |
| 4,558,333 | 12/1985 | Sugitani et al. . | |
| 4,608,577 | 8/1986 | Hori . | |
| 4,621,224 | 11/1986 | Watabe et al. | 318/594 |
| 4,723,129 | 2/1988 | Endo et al. . | |
| 4,740,796 | 4/1988 | Endo et al. . | |
| 4,802,777 | 2/1989 | Yamada | 318/594 |
| 5,170,184 | 12/1992 | Hanabusa et al. . | |
| 5,173,647 | 12/1992 | Hashimato | 318/601 |
| 5,183,333 | 2/1993 | Minowa | 400/605 |
| 5,291,248 | 3/1994 | Isobe | 355/228 |
| 5,547,295 | 8/1996 | Kanemitsu | 400/279 |

FOREIGN PATENT DOCUMENTS

| | | |
|---|---|---|
| 3032857 | 3/1981 | Germany . |
| 3220297 | 5/1983 | Germany . |
| 3330544 | 3/1984 | Germany . |
| 4013583 | 11/1991 | Germany . |
| 54-056847 | 5/1979 | Japan . |
| 59-123670 | 7/1984 | Japan . |
| 59-138461 | 8/1984 | Japan . |
| 60-071260 | 4/1985 | Japan . |
| 2127176 | 4/1984 | United Kingdom . |

*Primary Examiner*—David S. Martin

*Attorney, Agent, or Firm*—Fitzpatrick, Cella, Harper & Scinto

[57] ABSTRACT

An ink jet recording apparatus has a recording head mounted on a carrier which is shifted by a stepping motor in recording. The stepping motor is also utilized as a power source of a recovery system device. The drive mode of the stepping motor for the recovery system is differentiated from that for the recording.

5 Claims, 20 Drawing Sheets

RECORDING APPARATUS WITH A STEP MOTOR CONTROLLING MECHANISM

This application is a continuation of application Ser. No. 08/181,532 filed Jan. 14, 1994, now abandoned.

BACKGROUND OF THE INVENTION

1. Field of the Invention

The present invention relates to a recording apparatus and more particularly to a serial type recording apparatus having a recording head loaded on a carrier which is run in a direction perpendicular to the feeding direction of a recording material for recording.

2. Related Background Art

Conventionally, recording apparatuses have a recording head loaded on a carrier, which is run by a conveying mechanism driven by a pulse motor in a perpendicular direction to a feeding direction of a recording medium. Recording information is sent to the recording head in synchronism with movement of the pulse motor to carry out recording.

In such a recording apparatus, in order to stabilize the speed of the carrier during recording, there are provided sufficient acceleration and deceleration areas before and behind a recording region (the width of a recording paper). However, there is a problem that the width of the apparatus becomes fairly large as compared with the recording region, i.e., the maximum width of printable recording mediums (recording papers).

Also, in order to obtain a reference of recording positions relative to the recording medium, the recording apparatus is provided with a sensor (hereinafter called the home position sensor) for detecting the position of the carrier or the recording head.

Also, it is well known that the abnormal positional condition of the carrier caused by the jam of the recording material, the trouble of the pulse motor or the like is detected and a predetermined error treatment is executed based on the detection. For this reason, e.g., encoders are provided to the pulse motor and the carrier to monitor the outputs of the encoders.

However, when the encoders or the like are additionally provided, the apparatus becomes expensive and extra spaces are required for those provisions, so that the apparatus becomes large.

Further, when such a recording apparatus is an ink jet recording apparatus, a recovery system device is provided therein so as to keep the condition of the recording head constantly preferably. A carrier motor is utilized as the power source of the recovery system device.

The recovery system device performs wiping and capping operations, which require larger torques than the operation for running the carrier. Also, at the time of the carrier running operation (recording operation), the number of rotations needs to be increased. Therefore, a motor satisfying these conditions of the torque and the number of rotations is selected for the carrier motor.

Further, a stepping motor is comparatively easy to control and then selected as the carrier motor. The stepping motor is driven by the two-phase excitation.

However, the motor to be used as the carrier motor needs to satisfy the above conditions in the conventional recording apparatus, so that there is a limit to form the motor smaller, which is a big problem to miniaturize the whole body of the apparatus.

SUMMARY OF THE INVENTION

It is therefore an object of the present invention to provide an ink jet recording apparatus capable of satisfying the condition of the torque required in the recovery system operation and the condition of the number of rotations required in the recording operation and forming the carrier motor smaller to miniaturize the whole body of the apparatus.

It is another object of the present invention to provide an ink jet recording apparatus capable of lessening the width thereof as compared with a conventional ink jet recording apparatus having the same size printing region.

It is still another object of the present invention to provide an ink jet recording apparatus capable of forming it inexpensively and performing judgments at the time of abnormal conditions with high reliability.

DETAILED DESCRIPTION OF THE PREFERRED EMBODIMENTS

Preferred embodiments of the present invention will be described with reference to the accompanying drawings now.

Figure 1:
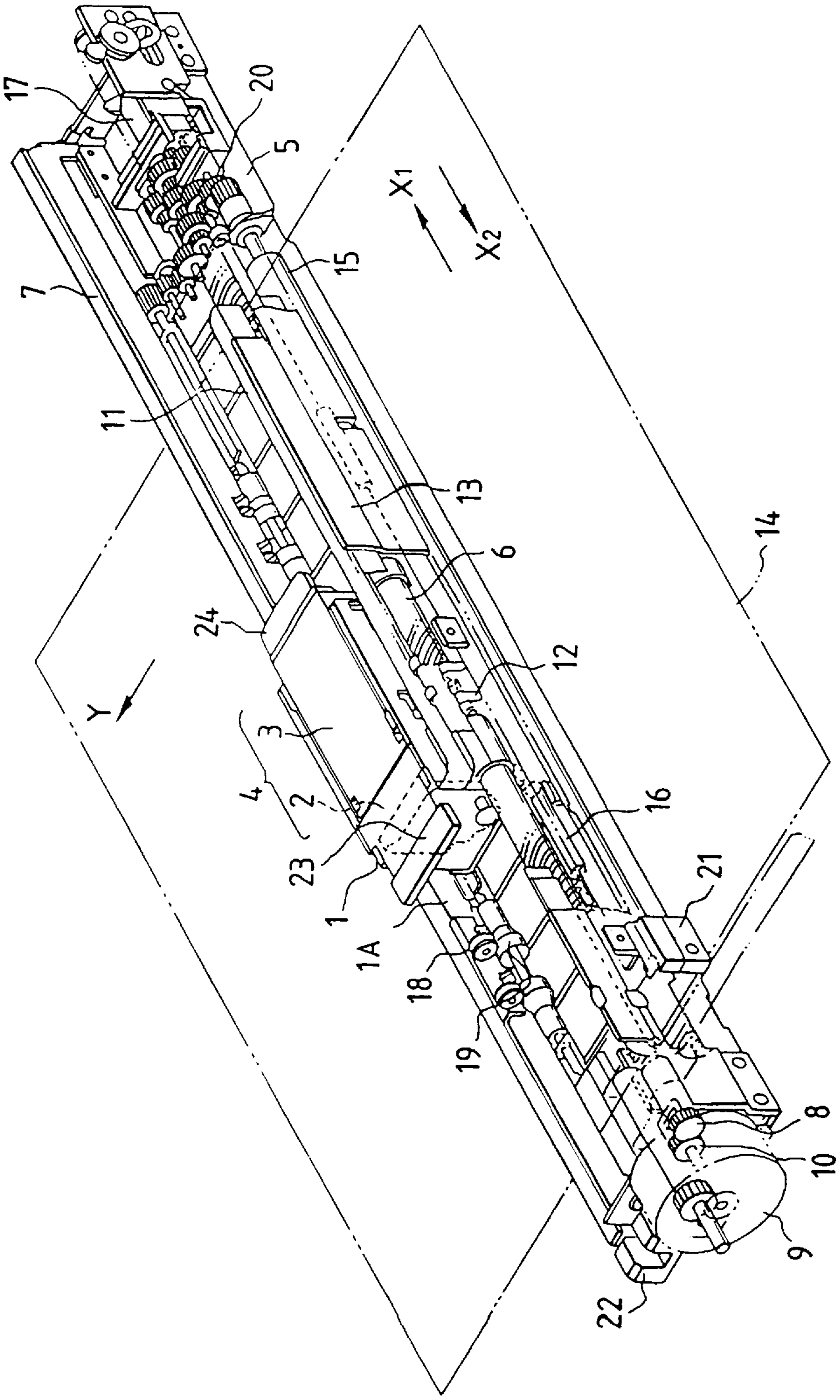
FIG. 1 is a perspective view of an ink jet recording apparatus according to the present invention.

FIG. 1 illustrates an ink jet recording apparatus (ink jet recording apparatus) according to the present invention schematically. A carrier 1 has a head cartridge 4 disposed thereon. The head cartridge 4 is constituted of a recording head 2 and an ink tank 3 connected to the recording head 2. One end of the carrier 1 on the side of the recording head 2 is fitted on a lead screw 6 so as to be slidable in its axis direction. The lead screw 6 is supported rotatably by a chassis 5 forming a frame of the apparatus. The other end of the carrier 1 is provided with a guide (not shown) which is fitted on a guide rail 7 formed on the chassis 5 so as to be slidable parallely to the axis of the leads screw 6. Accordingly, the carrier 1 can be moved reciprocatively in the axis direction of the lead screw 6 in accordance with rotation of the lead screw 6 with the attitude of the carrier 1 kept continually uniformly.

A lead screw gear 8 is fixed to the left end of the lead screw 6 and meshed with a pinion gear 10 fixed to an output shaft of a carrier motor 9. A lead pin (not shown) mounted to the carrier 1 is engaged with a guide stripe or groove (not shown) which is formed on the lead screw 6 in a spiral form at a predetermined pitch. Therefore, as the lead screw 6 is rotated forwardly and reversely in accordance with forward and reverse drives of the carrier motor 9, the carrier 1 performs reciprocating movement.

A numeral number 11 represents a flexible cable for sending recording signals from an electric circuit to be described later to the recording head 2. The flexible cable 11 is supported by a flexible cable holder 12 and positioned with respect to a pinch roller frame 13.

Ink is discharged from the recording head 2 in synchronism with the reciprocating movement (scan) of the carrier 1 to carry out recording for a line on a recording material 14. The recording head 2 has minute liquid discharge openings (orifices), liquid pathways, energy acting portions provided on respective parts of the liquid pathways and energy generating means for generating energy at the energy acting portions to act on the liquid (ink). Ink droplets are discharged from the orifices due to the energy generated by the energy generating means.

The energy generating means includes electromechanical transducing elements such as a piezo element, elements to be heated by electromagnetic waves such as a laser or electrothermal conversion elements having exothermic resistances.

If the energy generating means of the recording head 2 is a type of using thermal energy among them, it is possible to arrange the liquid discharge openings at a high density thereby to be able to print or record with a high resolution. Further, if the electrothermal conversion elements are utilized for the energy generating means, it is possible to easily form the recording head 2 compacter as well as to make full use of advantages of IC and microprocessing techniques whose progress and elevation of reliability are remarkable in the field of semiconductors recently. Also, its manufacturing cost is inexpensive.

After recording one line by the scan of the carrier 1, the recording medium 14 such as a recording paper or the like is fed by a line to record the following line. This feeding of the recording material 14 is performed by a feed roller 15, pinch rollers 16 and feed rollers 19 and spurs 18.

That is, the recording material 14 with a portion to be recorded facing the discharge surface of the recording head 2 is pressed against the feed roller 15 by the pinch rollers 16 and then the feed roller 15 is rotated by a paper feed motor 17 for a predetermined amount to position the unrecorded portion of the recording material for the following line in the recording position. After the entire recording has been completed, the recording material 14 is pressed against the feed rollers 19 by the spurs 18 and fed out of the recording apparatus in accordance with rotation of the feed rollers 19.

Although the drive of the feed rollers 15 and 19 is conducted by the paper feed motor 17, the drive force is transmitted by a train of reduction gears 20.

A paper sensor 21 detects the presence or absence of the recording material 14. A numeral number 22 represents a home position sensor comprising a photo interrupter. An interrupting plate 1A is attached to the carrier 1 so as to move together with the carrier 1. The home position sensor 22 detects by the interruption/uninterruption of the interrupting plate 1A whether the carrier 1 is located at a home position (left side in FIG. 1) or not.

Figure 2:
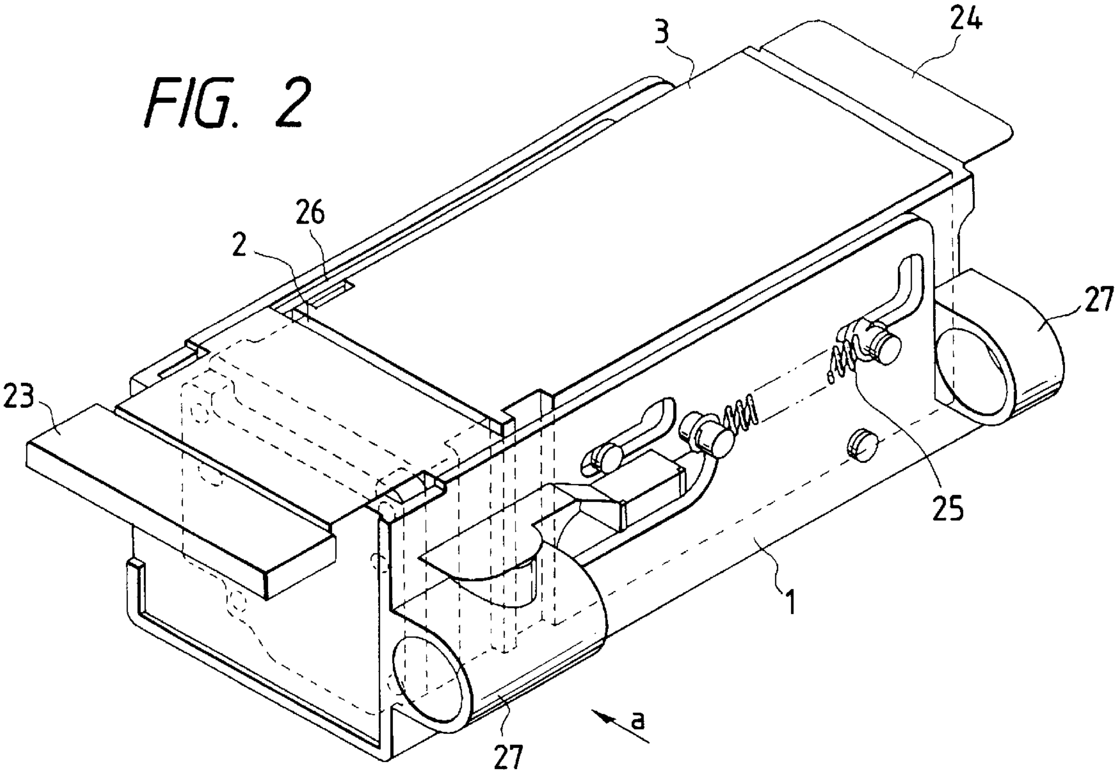
FIG. 2 is a perspective view of the carrier of FIG. 1.

FIG. 2 illustrates a perspective view of the head cartridge and carrier portions of the ink jet recording apparatus in FIG. 1. A numeral number 23 is a head lever for holding and removing the recording head 2 while a numeral number 24 is an ink tank lever for holding and removing the ink tank 3. A head holder spring 25 is for fixing the recording head 2 relative to the carrier 1. A tank case 26 is for supporting the ink tank 3. The carrier 1 is mounted to the lead screw 6 by inserting the lead screw 6 in the holes of connecting portions 27.

The recording head 2 is constituted in layers of a base plate formed with a plurality of electrothermal conversion elements for generating thermal energy to be used for ink discharges and a drive circuit for driving the electrothermal conversion elements, the discharge openings and the liquid pathways on the base plate corresponding to the respective electrothermal conversion elements, and a top plate thereon for forming a common liquid chamber connected to the respective liquid pathways. Also, the recording head 2 is provided with contacts for supplying signals from the recording apparatus body to the drive circuit. Further, various sensors may be provided in the recording head 2 to detect its condition from the recording apparatus body. As such sensors, there are, e.g., a temperature detection sensor for detecting temperatures in the vicinity of the electrothermal conversion elements, an ink remaining amount detection sensor for detecting the time when the ink in the common liquid chamber has been consumed and a head type discriminating sensor for specifying the type of head cartridge when using different types of inks in ink tanks or different types of recording heads while replacing them. The recording apparatus body judges signals from those sensors and controls signals to be sent to the electrothermal conversion elements thereby to make recording condition optimally.

Thus structured recording head 2 is mounted to the recording apparatus such that its discharge surface with the discharge openings faces the recording material 14.

Now, it will be described a method of connecting the recording head 2 with the carrier 1 mechanically and electrically at the time of replacing the recording head or the head cartridge connected with the recording head and the ink tank.

Figure 3:
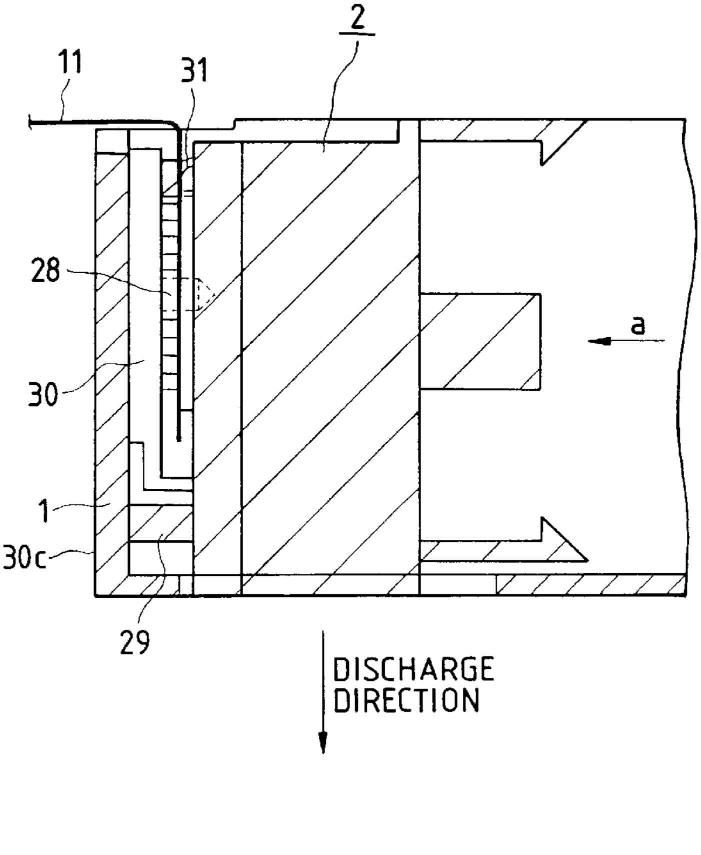
FIG. 3 is a partially enlarged cross section of the carrier of FIG. 2.
Figure 4:
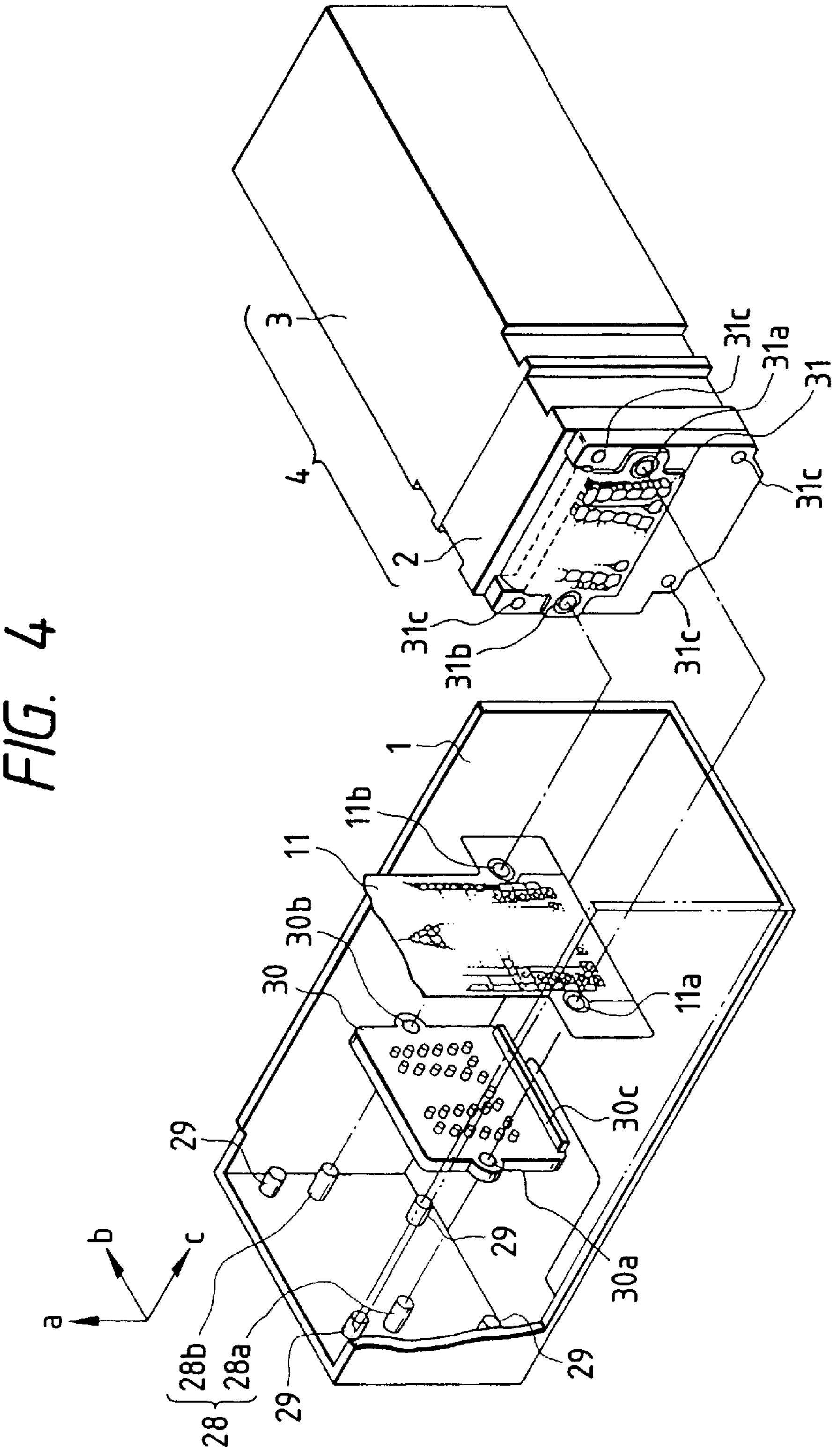
FIG. 4 is a perspective view illustrating a procedure of connecting the carrier and the head cartridge of FIG. 2.

FIG. 3 is a cross section illustrating a connected portion of the carrier 1 and the recording head 2 observed from a direction as indicated by an arrow a in FIG. 2. FIG. 4 is a partly broken perspective view illustrating a procedure of mounting the head cartridge 4 to the carrier 1.

In FIGS. 3 and 4, positioning pins 28 are fixed to the carrier 1 and engaged with holes provided in the recording head 2 to position the recording head 2 to the carrier 1 in the directions as indicated by arrows a and b in FIG. 4. Stoppers 29 are also fixed to the carrier 1 and receives the recording head 2 pressed in the direction as indicated by an arrow a in FIG. 3 against the carrier 1. The flexible cable 11 connects the recording apparatus body and the recording head 2 electrically. Positioning holes 11*a* and 11*b* are formed in the flexible cable 11. A flexible cable pad 30 is sandwitched between the carrier 1 and the flexible cable 11 to support the flexible cable 11 elastically. Positioning holes 30*a* and 30*b* are formed in the flexible cable pad 30. A numeral number 30*c* is an ink barrier for preventing ink from entering into a contact portion. A head contact portion 31 provided on the recording head 2 is electrically connected to heaters (electrothermal conversion elements) in the recording head 2. Positioning holes 31*a* and 31*b* are formed in the head contact portion 31. Numeral numbers 31*c* are stopper contact areas to be in contact with end surfaces of the stoppers 29.

The recording head 2 is pressed by a head holder spring 25 in FIG. 2 via a lever (not shown) in the direction as indicated by the arrow a in FIG. 3. The position of the recording head 2 is unfailingly determined by the engagement between the positioning holes 31*a* and 31*b* of the recording head 2 and the positioning pins 28 and the interference of the stoppers 29. Thus, the recording head 2 is connected to the carrier 1 mechanically.

The head contact portion 31 of the recording head 2 and an end surface of the flexible cable 11 is each provided with a plurality of contacts correspondingly such that the contacts of the head contact portion 31 face the respective contacts of the flexible cable 11. By pressing the respective contacts of the head contact portion 31 and the flexible cable 11 against each other by a predetermined force, the recording apparatus body is electrically connected to the recording head 2. At this time, since all the contacts need to be pressed wholly and uniformly, there is provided the flexible cable pad 30 formed of an elastic material at the pressing portion. The material of the flexible cable pad 30 is, e.g., silicon rubber. The flexible cable pad 30 has a plurality of projections at the positions corresponding to the contacts of the flexible cable 11 and the head contact portion 31, so that the pressing force is concentrated to the contacts. Also, the contacts of the flexible cable 11 may be in the shape of a projection in order to further concentrate the pressing force thereby to bring the contacts of the flexible cable 11 into sure contact with the contacts of the head contact portion 31.

As the reaction force generated at the time of pressing is smaller than the force of the head holder spring 25 pressing the recording head 2, the recording head 2 will not be displaced owing to the reaction force from the flexible cable pad 30.

It is necessary to position the carrier 1, the flexible cable pad 30, the flexible cable 11, the head contact portion 31 and the head cartridge 4 each other with precision in order to obtain sure electrical contact and preferable recording quality. Therefore, they are structured as follows.

That is, the two positioning pins 28 of the carrier 1 are made as the reference points and the one positioning pin 28*a* is fitted in the positioning holes 30*a,* 11*a* and 31*a* while the other positioning pin 28*b* is fitted in the positioning holes 30*a,* 11*b* and 31*b*. Thereby, the positioning in the directions as indicated by the arrows a and b in FIG. 4 is completed.

Then, the recording head 2 is pressed toward the direction as indicated by the arrow a in FIG. 3 until the stopper contact areas 31*c* of the head contact portion 31 are brought into contact with the end surfaces of the stoppers 29. Accordingly, the position of the recording head 2 in the direction as indicated by the arrow c in FIG. 4 is completed.

Figure 5:
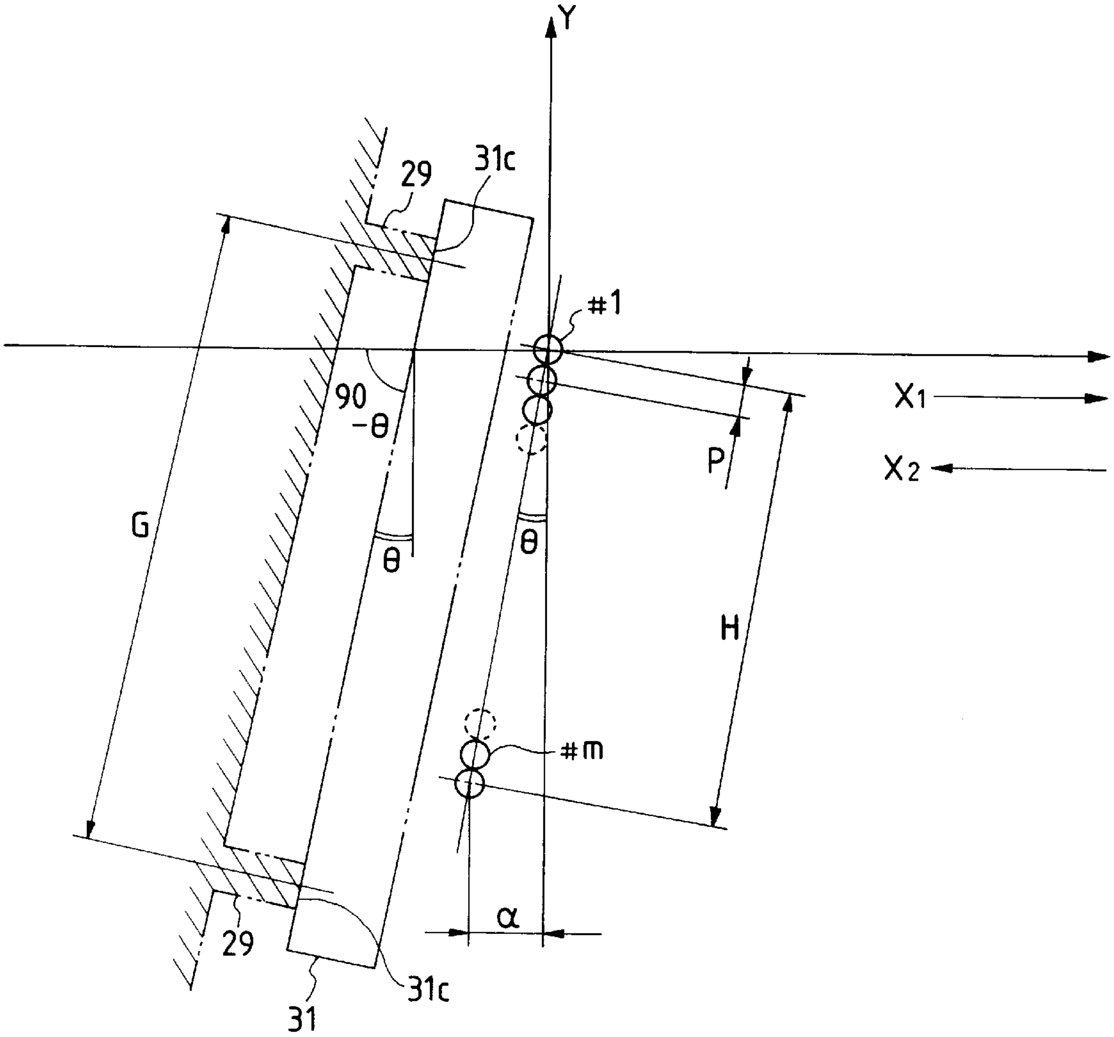
FIG. 5 is a schematic diagram illustrating a method of positioning the carrier and the head cartridge of FIG. 2.

As illustrated in FIG. 5, the stoppers 29 are formed so as to have a predetermined inclination θ with respect to the conveying directions X1 and X2. Therefore, when the recording head 2 is positioned to the carrier 1, the nozzles (discharge openings or orifices) #1 to #m arranged at a predetermined pitch P in the Y direction are inclined at a predetermined amount d with respect to the length H of the arranged nozzles. Also, the distance G between the stoppers 29 is taken larger than the length H so as to keep the predetermined amount d accurately.

It will be described the structure and the electric circuit of an information processor equipped with the above-described ink jet recording apparatus hereinafter.

Figure 6:
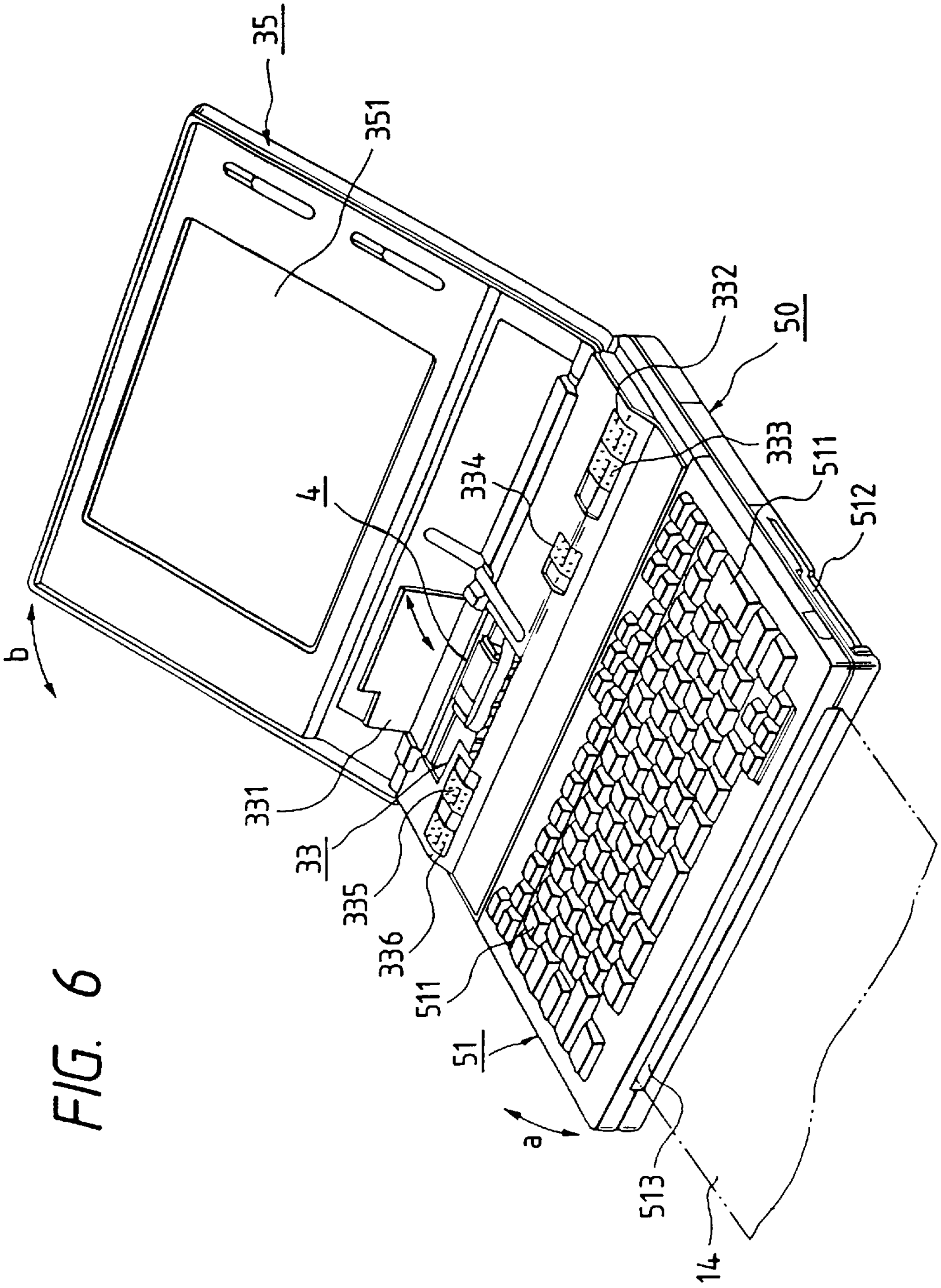
FIG. 6 is a perspective view of an information processor equipped with the ink jet recording apparatus of FIG. 1.

FIG. 6 illustrates an information processor 50 equipped with the recording apparatus in FIG. 1 schematically. The information processor 50 is a handy type personal computer. The information processor 50 is constructed of a recording apparatus 33 comprising the above-mentioned ink jet recording apparatus, a keyboard 51 and a display 35. The keyboard 51 has keys 511 for inputting letters, figures, characters or the like, and function keys 512 for inputting various commands. The display 35 has a display screen 351 for displaying processed information.

The printer 33 has a window 331 formed of transparent plastic through which the movement of the head cartridge 4 can be observed. The window 331 is openable for replacement of the ink tank or the like. Keys 332, 333, etc. are for commanding a recovery processing operation, a paper feeding operation, etc. A floppy disk can be inserted in a slit 512 provided under the keyboard 51.

The display 35 is provided rotatably in the direction as indicated by the arrow b in FIG. 6 and then can be folded together with the keyboard 51 at the time of carrying about the information processor 50. Also, the keyboard 51 is rotatable in the direction as indicated by the arrow a in FIG. 6, facilitating the setting of the recording paper 14 into the recording apparatus 33.

Figure 7:
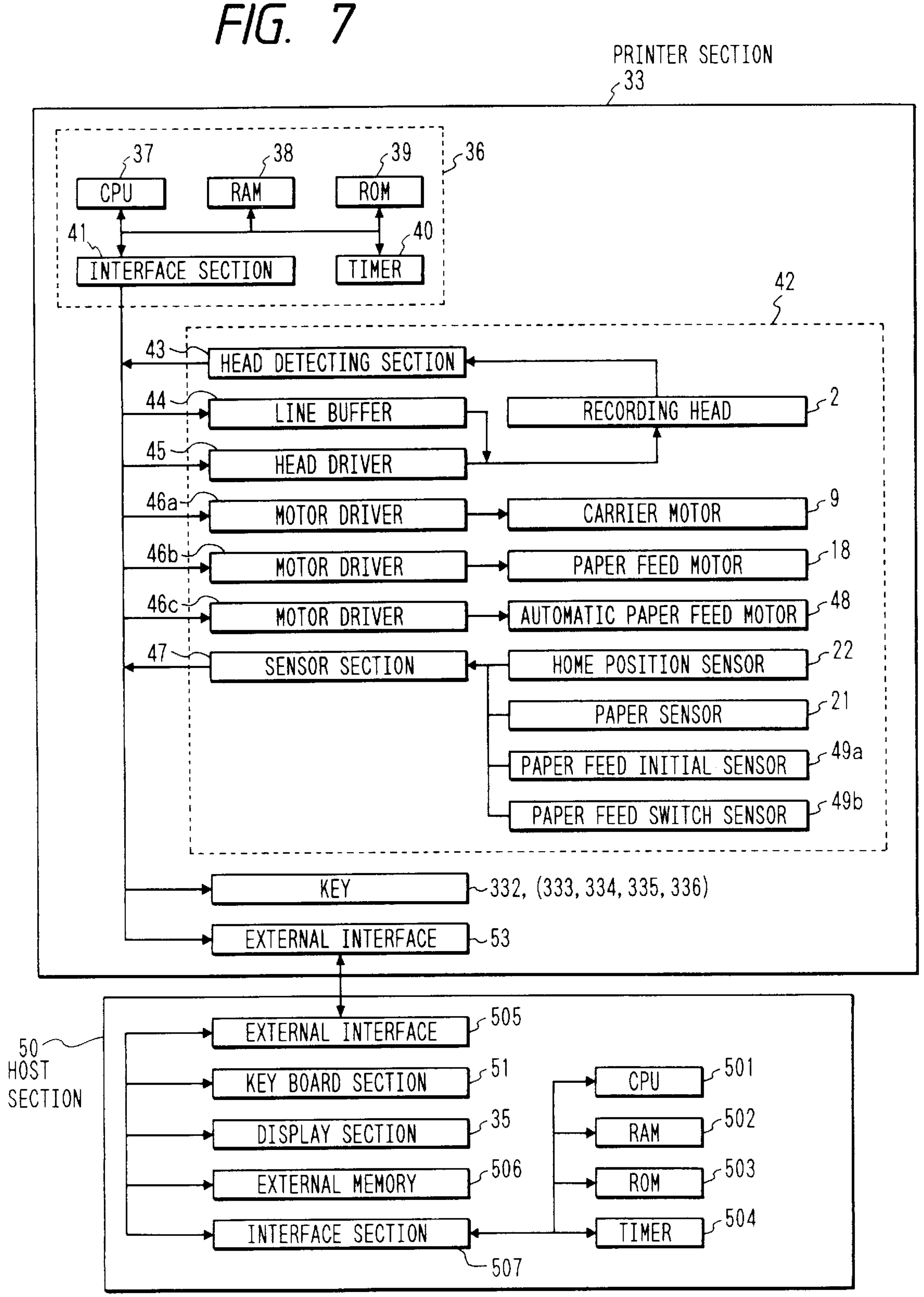
FIG. 7 is a block diagram of a control circuit of the information processor of FIG. 6.

FIG. 7 is a block diagram illustrating the structure of the control circuits of the above information processor 50 and its printer section 33.

First, the control circuit of the printer section 33 will be described. A numeral 36 represents a controller for master control. CPU 37 is, e.g., a microcomputer type and executes the processing procedure on the side of the printer, which will be later described in detail. A RAM 38 has operation areas for the above processing procedure. A ROM 39 stores programs corresponding to the processing procedure. A timer 40 forms timings necessary for the recording operation by the printer section 33 having formed the execution cycle of the CPU 37. An interface section 41 connects signals from the CPU 37 and a host section.

A numeral number 42 represents a driving section of the printer section 33. A head detecting section 43 detects information of the recording head 2 such as the presence or absence of the recording head 2, the type of the recording head 2, the output value of each sensor for detecting the temperature of the recording head 2, the output value of a sensor for detecting the presence or absence of the ink in the ink tank 3. A line buffer 44 stores recording data for the recording head 2. A head driver 45 supplies drive signals and electric power to the recording head 2. Motor drivers 46*a*, 46*b* and 46*c* supply necessary signals and electric power respectively for the carrier motor 9, the spurs 18 and an automatic paper feed motor 48. A sensor section 47 detects outputs from the home position sensor 22, the paper sensor 21, a paper feed initial sensor 49*a* and a paper feed switch sensor 49*b*.

Next, the control circuit of the host section of the printer processor will be described. The host section has a CPU 501 for executing processing on the side of the host section. A ROM 503 stores its processing procedure and font data. A RAM 502 has an area for developing text data and image data other than an operation area.

The CPU 501 causes the display 35 to display a predetermined indication while carrying out the supply and reception of signals with the printer section 33. An external memory 506 is, e.g., FDD, HDD or RAM cards. An external interface 505 is for performing communication with other information processors, or controlling peripheral apparatuses by connecting them to the bus therein.

There is also provided a power source (not shown) for supplying electric power to the above control circuits. It is, e.g., a charging-type battery, a throwaway dry cell or a convertor for the AC power source when using the information processor in a stationary manner.

Although the recording is performed on the recording material (paper) 14 at the recording apparatus by means of the above-described control circuits, it will be described hereinafter the discharge control of the recording head 2 schematically with reference to the timing chart in FIG. 8.

Figure 8:
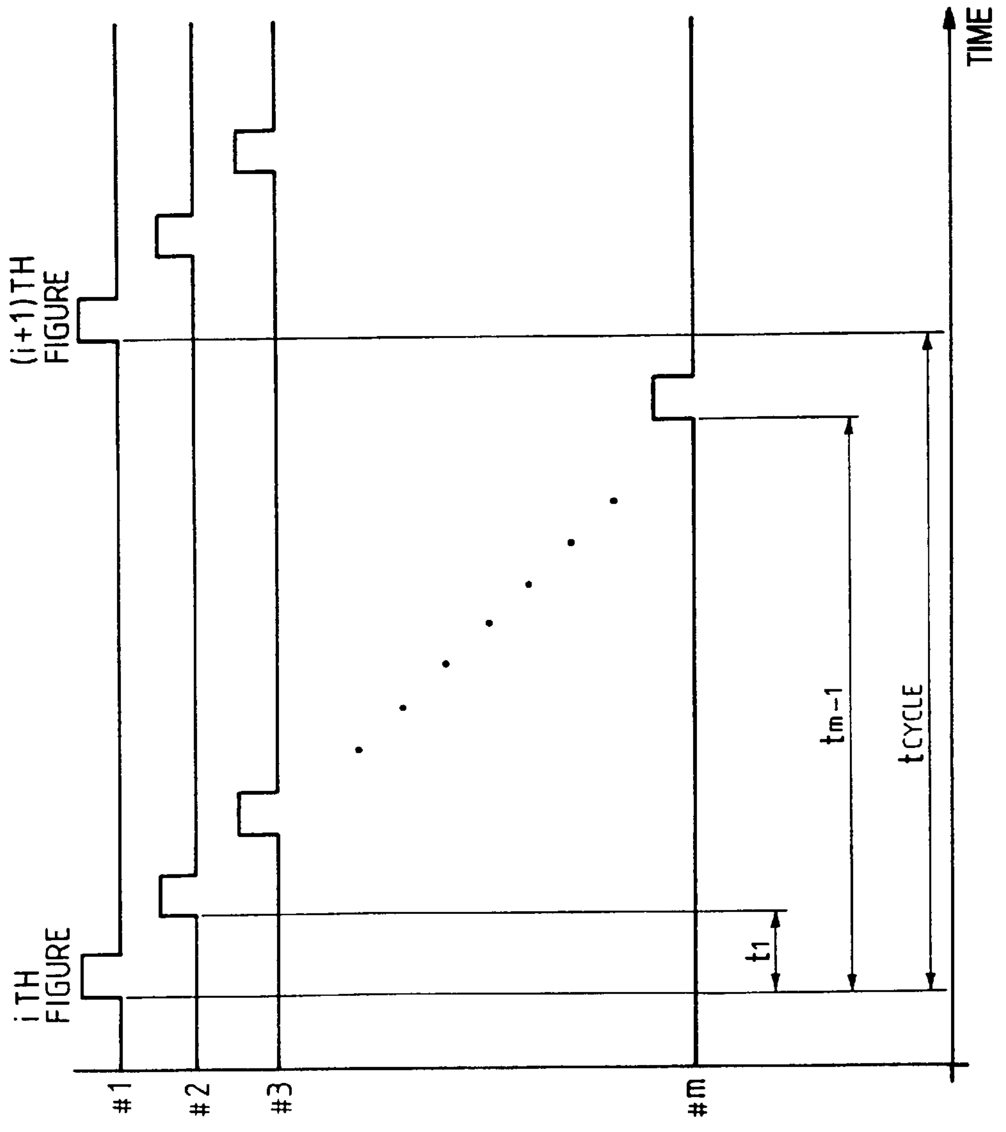
FIG. 8 is a timing chart illustrating the timing of ink discharge of the recording head of FIG. 1.

FIG. 8 illustrates the timing chart at the time of discharging ink from the recording head 2 while making the carrier 1 scan in the direction X1 (refer to FIG. 1 and FIG. 5).

Ink is discharged from the nozzles $\#_1$ to $\#_m$ of the recording head 2 in order from $\#_1$ to $\#_m$ successively. $t_1$ represents the time difference between the discharges of the nozzles $\#_1$ and $\#_2$. $t_{m-1}$ represents the time difference between the discharges of the nozzles $\#_1$ and $\#_m$. T cycle represents a discharge cycle of the same nozzle. It is preferable to set the time differences between the adjacent nozzles uniformly. That results $t_{m-1}=(m-1)\times t_1$. Then, while running the carrier 1 in the direction X1 at the speed of R/t cycle, the ink discharge is carried out at $t_{m-1}=d\times t$ cycle/R, which cancels the inclination d of the nozzles (refer to FIG. 5) and the time difference $t_{m-1}$ of the discharges of the nozzles thereby to enable uninclined printing.

Now, it will be described replacements of the recording head 2 and the ink tank 3 in the ink jet printer with reference to FIGS. 9 to 12.

Figure 9:
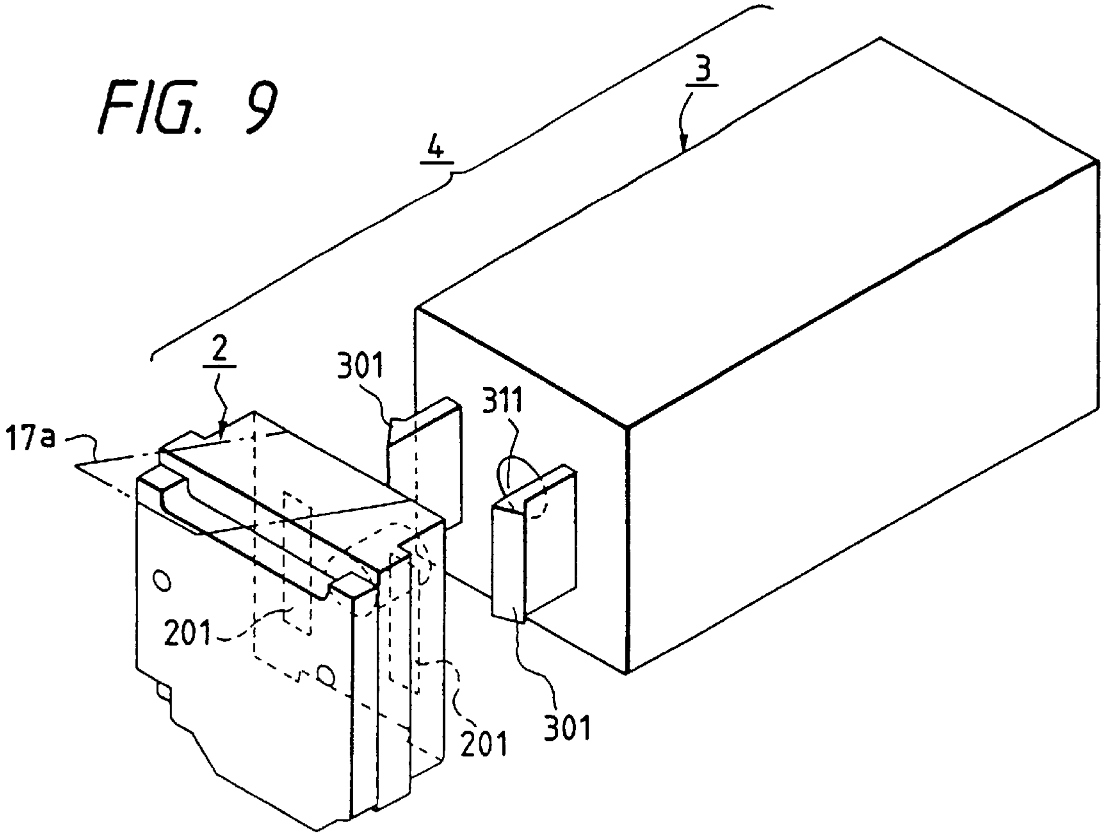
FIG. 9 is a perspective view for disclosing the engagement of the recording head and the ink tank constituting the head cartridge of FIG. 2.

FIG. 9 is a perspective view schematically illustrating the recording head 2 and the ink tank 3.

In FIG. 9, the ink tank 3 is formed with engaging claws 301 and the recording head 2 is formed with engaging holes 201 facing the respective engaging claws 301. A head tab 17*a* is for facilitating removal of the recording head 2 from the carrier 1.

No ink tank guide groove is provided in the ink tank 3.

Figure 10:
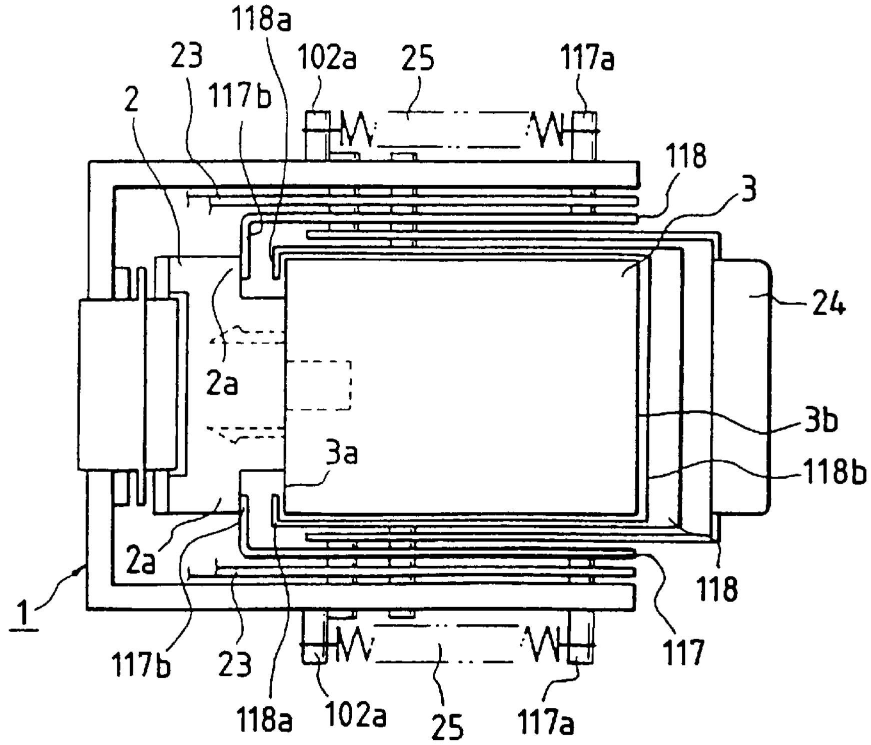
FIG. 10 is a top plan view for disclosing the engagement between the recording head and the ink tank in FIG. 9.

FIG. 10 is a schematic top view of the head cartridge portion with the recording head 2 and the ink tank of FIG. 9 and the carrier portion.

In FIG. 10, the carrier 1 supports the recording head 2 and the ink tank 3 and scans in the $X_1$ and $X_2$ directions, as mentioned above. The head lever 23 is for holding or removing the recording head 2. The ink tank lever 24 is for holding or the removing the ink tank 3. Head holders 117 urge the recording head 2. The head pressure springs 25 are provided between shaft portions 117*a* of the head holders 117 and shaft portions 102*a* of the carrier 1. The urging forces of the head pressure springs 25 are transmitted to pressure receiving portions 2*a* of the recording head 2 via pressure portions 117*b* of the head holders 117. An ink tank holder 118 causes the ink tank 3 to move in accordance with the operation of the ink tank lever 24 and has front end acting portions 118*a* for acting on a side end portion 3*a* of the ink tank 3 and a rear end acting portion 118*b* for acting on a side end portion 3*b* of the ink tank 3.

Replacement of the Recording Head

Figure 11:
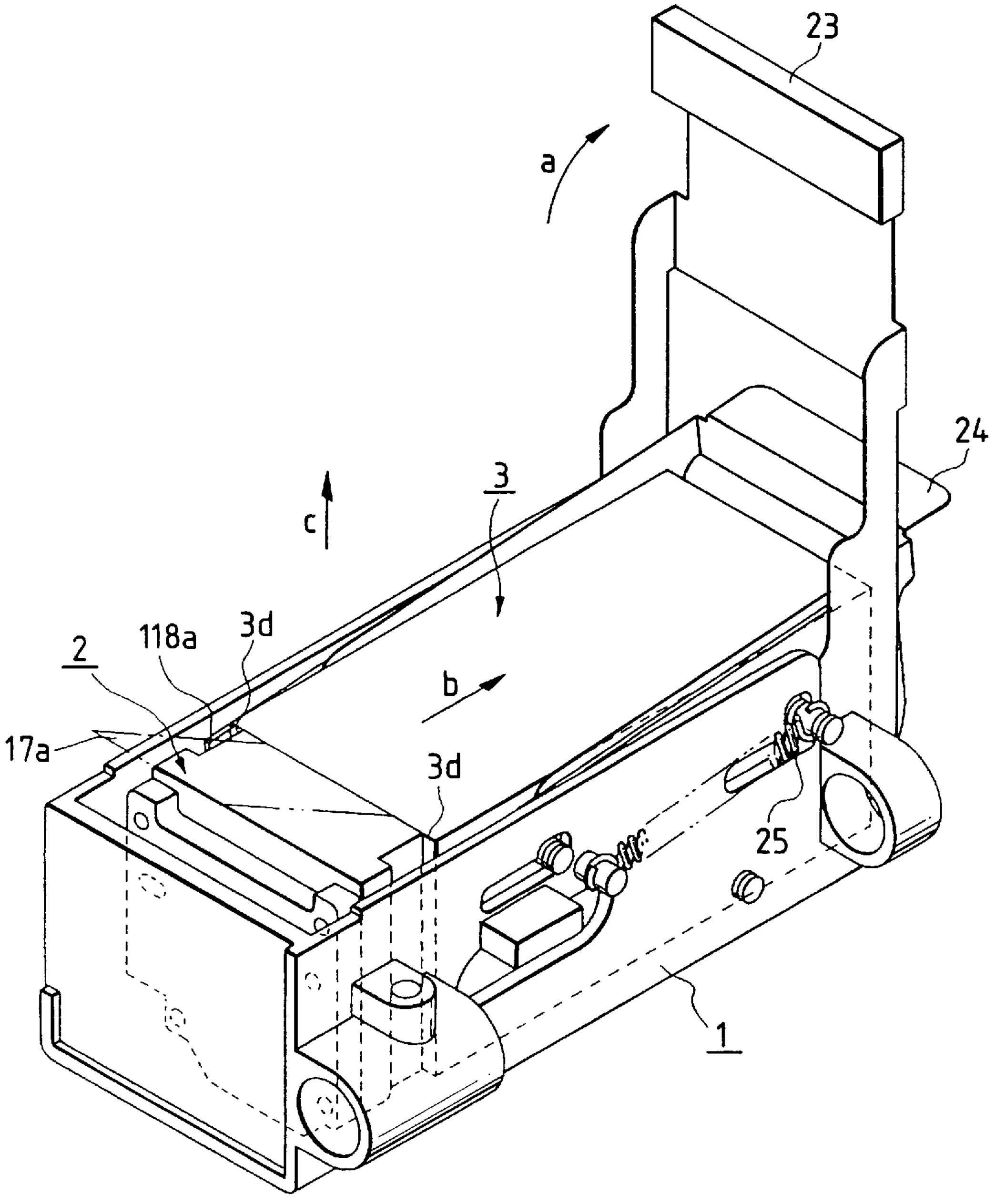
FIG. 11 is a perspective view for disclosing a method of removing the recording head and the ink tank of FIG. 9 together as one body.

FIG. 11 is a perspective view illustrating a procedure of removing both the recording head 2 and the ink tank 3 of FIG. 9 together.

In this case, the head lever 23 is rotated in the a direction to be raised to the position shown in FIG. 11. At this time, cams provided on the head lever 23 move the head holders 117 in the b direction, causing the pressing forces of the head pressure springs 25 having pressed the recording head 2 via the head holders 117 to be released. Also, the head lever 23 moves the ink tank holder 118 in the b direction. At this time, the front end acting portions 118*a* of the ink tank holder 118 are brought into contact with the side end portion 3*a* of the ink tank 3 on the side of the recording head 2 and moved in the direction b, so that the recording head 2 and the ink tank 3 are moved together as one body in the direction b. In this condition, the recording head 2 and the ink tank 3 are movable in the c direction as one body. Then, they can be taken out of the carrier 1 by grasping and raising the head tab 17*a*. On the other hand, the recording head 2 and the ink tank 3 can be connected and held in the carrier 1 by carrying out an opposite operation to the above removing operation.

Replacement of the Ink Tank

Figure 12:
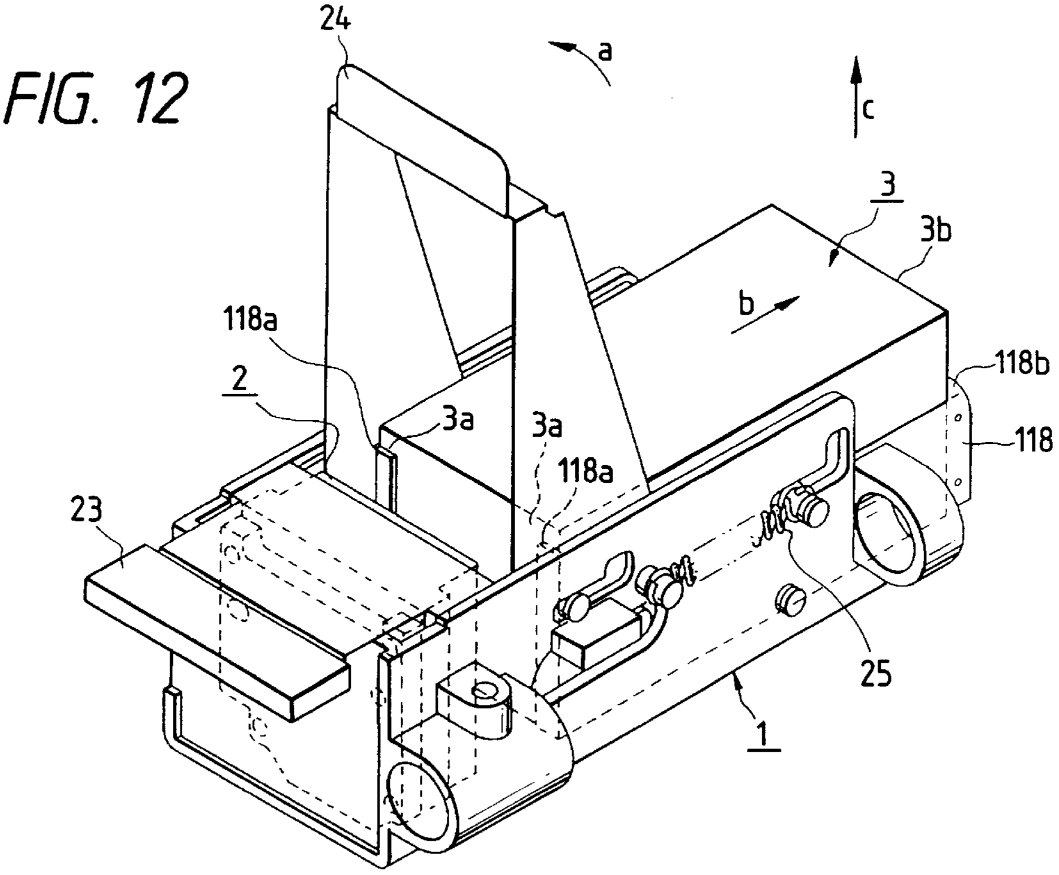
FIG. 12 is a perspective view for disclosing a method of separating the recording head and the ink tank of FIG. 9.

FIG. 12 is a perspective view illustrating a procedure of removing the ink tank 3 separately from the recording head 2 on the carrier 1.

In this case, the tank lever 24 is rotated in the a direction to be raised to a predetermined position. At this time, cams provided on the tank lever 24 move the ink tank holder 118 in the b direction, but will not move the head holders 117, causing the recording head 2 to be kept pressed by the head pressure springs 25. At this time, since the front end acting portions 118*a* of the ink tank holder 118 are brought into contact with the side end portion 3*a* of the ink tank 3 and moved therewith, the ink tank 3 is disconnected from the recording head 2 and moved in the b direction. In this condition, the ink tank 3 is movable in the c direction. Then, the ink tank 3 can be taken out of the carrier 1 by raising it. On the other hand, when the ink tank 3 is put in the ink tank holder 118 and the tank lever 24 is rotated in the reverse direction to the a direction, the cams of the tank lever 24 move the ink tank holder 118 in the reverse direction to the b direction. At this time, the rear end acting portion 118*b* of the ink tank holder 118 is brought into contact with the side end portion 3*b* of the ink tank 3 and moved there with. As a result, the ink tank 3 is moved in the reverse direction to the b direction, so that the ink tank 3 is connected to the recording head 2. Thus, the ink tank 3 is connected and held.

Next, it will be described a drive control of the carrier motor 9 in FIG. 7 of a first preferred embodiment according to the present invention with reference to FIGS. 13 to 15.

In this embodiment, a stepping motor used for the carrier motor 9 adopts half-step excitation in recording and micro step drive in driving a recovery system. In case of the half-step excitation, the stepping motor can be rotated at a higher speed and its noise is quieter as compared with two-phase excitation. Also, it is possible to obtain higher torques, higher resolution and quieter noise according to the micro step drive.

Figure 13:
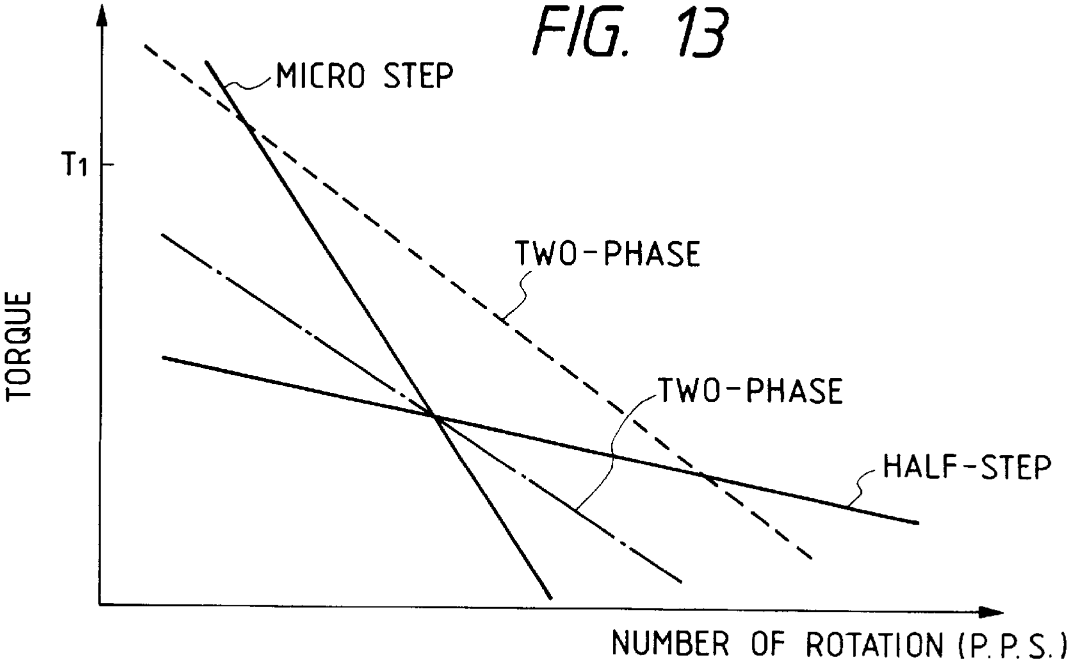
FIG. 13 is a diagram illustrating a relationship between the torque and the number of rotations of a stepping motor as the carrier motor of FIG. 7 according to a drive control of a first preferred embodiment.

FIG. 13 is a diagram illustrating a relationship between torques and the number of rotations when the same stepping motor is driven by the two-phase excitation (one-dot-chain line), the half-step excitation or the micro step drive.

Thus, the micro step drive is adopted to drive the recovery system and the half-step excitation is adopted to record in this embodiment. Accordingly, although a motor having a characteristic shown by a broken line in FIG. 13 is required in a conventional recording apparatus at the time of two-phase excitation, a motor having a characteristic shown by a one-dot-chain line at the time of the two-phase excitation can be used. That is, it is possible to use, as the carrier motor 9, a smaller stepping motor with smaller output as compared with the conventional recording apparatus.

Figure 14:
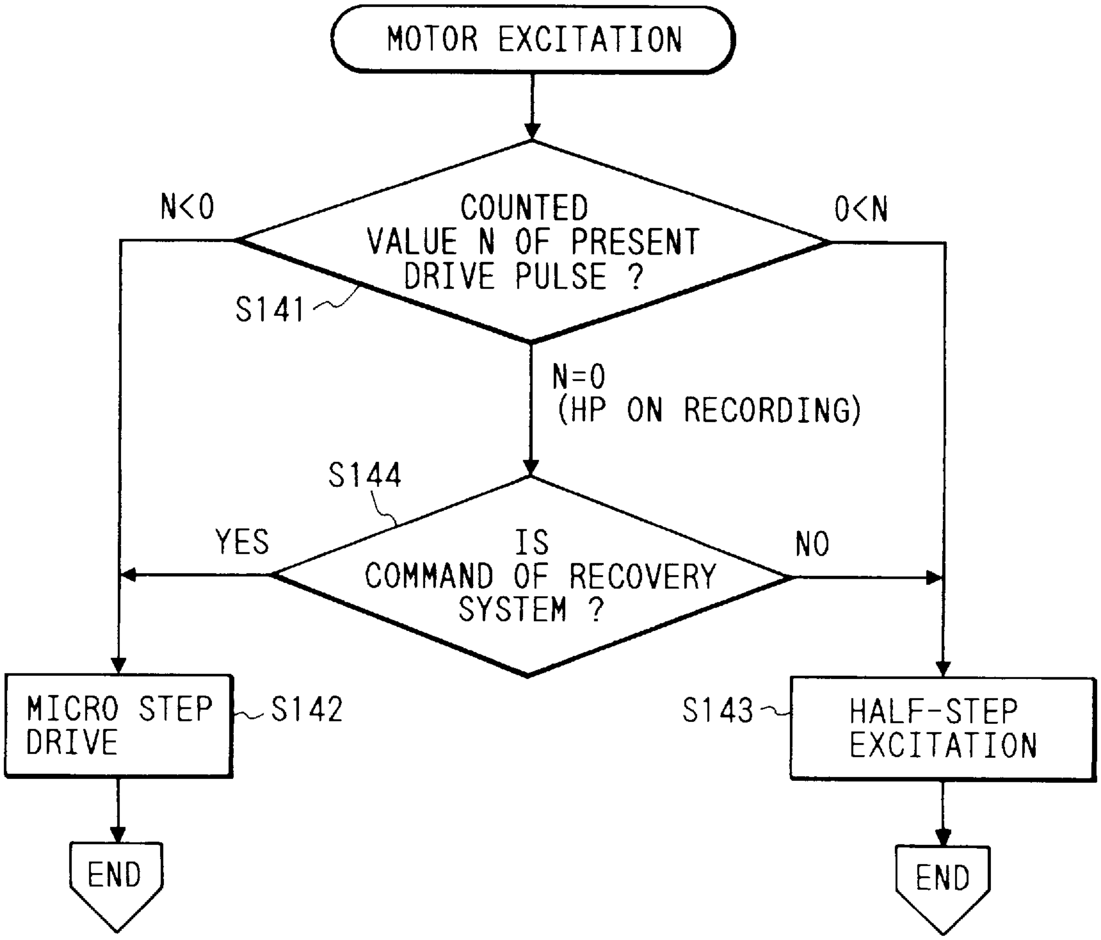
FIG. 14 is a flowchart illustrating a procedure of determining the motor excitation mode of the carrier motor of FIG. 7 according to the first embodiment.

The excitation mode for the carrier motor 9 in the first embodiment is determined by the procedure as shown in FIG. 14.

Upon receiving a new command, the CPU 37 judges the kind of command to determine the excitation mode.

FIG. 14 is a flowchart showing its processing procedure.

In the step S141, a recording home position (HP) is set to be 0 and the $X_1$ direction in FIG. 1 is set to be plus. Then, a present drive pulse counted value N is judged.

And, when N<0 and the carrier 1 is located in the recovery system region, the excitation mode is the micro step drive (step S142) and the procedure is completed.

On the other hand, when N>0 and the carrier 1 is located in the printing region, the half-step excitation is selected (step S143) and the procedure is completed.

When N=0 and the carrier 1 is located in the recording HP, the procedure goes to the step S144, wherein the kind of received command is judged. When the received command is the command of the recovery system, the micro step drive (step S142) is selected to complete the procedure. If not so, the half-step excitation (step S143) is selected to complete the procedure.

Figures 15A, 15B, 15C:
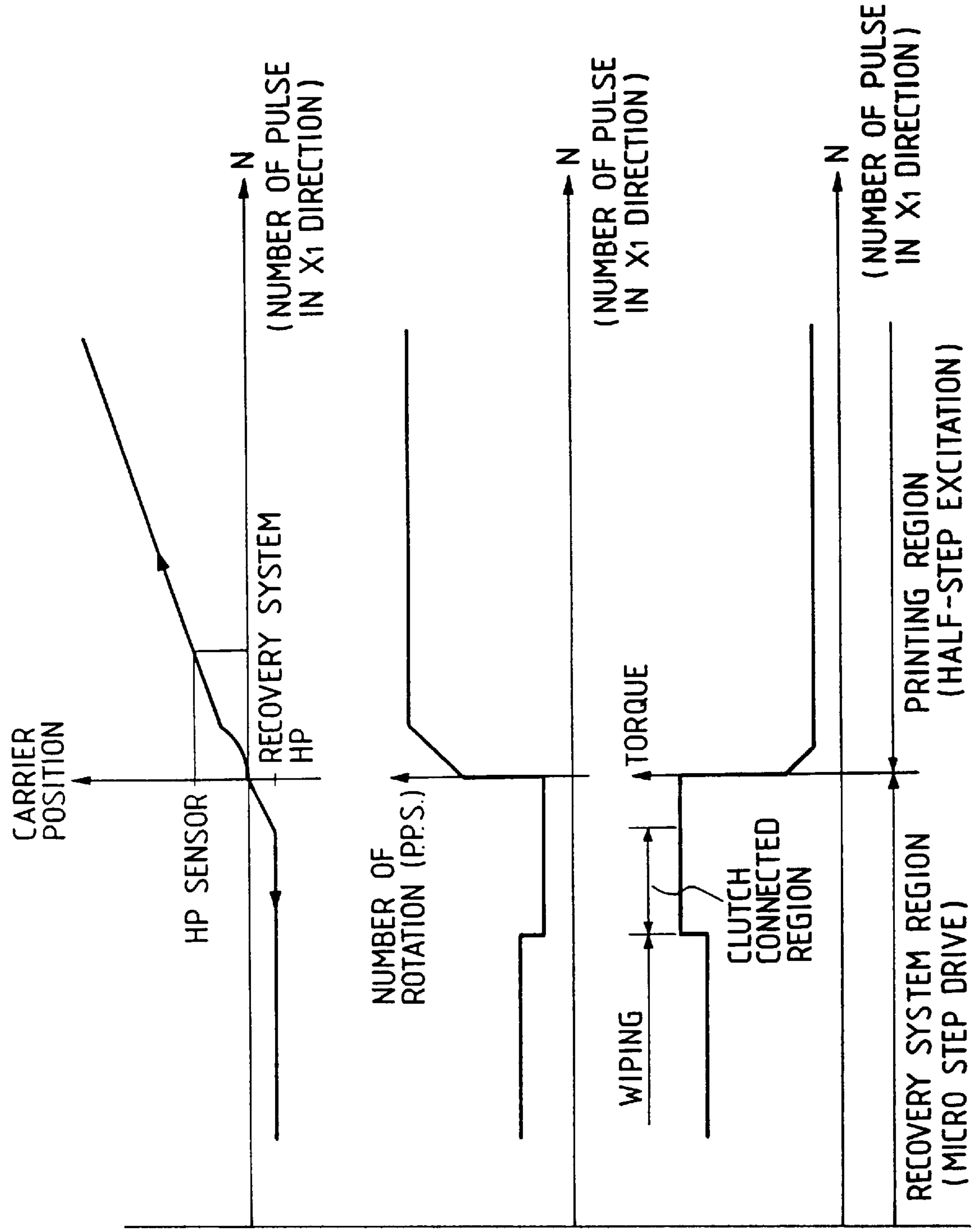
FIG. 15 is an explanatory view illustrating a relationship between the carrier position, the number of rotations and the torque with respect to the drive pulse counted value N of the carrier and the carrier motor of FIG. 7 according to the first embodiment.

FIG. 15 is a diagram illustrating the relationship between the carrier position, the number of rotations of the motor and the torque of the motor with respect to the drive pulse counted value N.

As illustrated in FIG. 15, when the carrier 1 is located in the recording HP (N=0) and the CPU 37 has received the command of the recording system, the excitation mode of the carrier motor 9 is set to be the half-step excitation. Then, the carrier motor 9 is accelerated for a predetermined period and thereafter driven at a constant speed.

Also, when the carrier 1 is located in the recording HP (N=0) and the CPU 37 has received the command of the recovery system, the CPU 37 sets the excitation mode of the carrier motor 9 to be the micro step drive. Then, after moving the carrier 1 to the recovery system home position (HP), the carrier motor 9 is rotated until the carrier motor 9 is connected to a device of the recovery system via a clutch. Thereafter, the carrier motor 9 is further rotated to cause the device of the recovery system to start a wiping operation.

Although the carrier motor 9 is used as the power source for the recovery system in the first embodiment, the carrier motor 9 may be used as a paper feed motor by driving the carrier motor 9 by means of the micro step drive.

As is apparent from the above description, the carrier motor can be miniaturized according to the first embodiment of the present invention, contributing to miniaturization of the whole body of the ink jet recording apparatus.

It will be described a drive control of the carrier motor 9 in FIG. 7 of a second preferred embodiment according to the present invention with reference to FIGS. 16 to 20.

Figure 16:
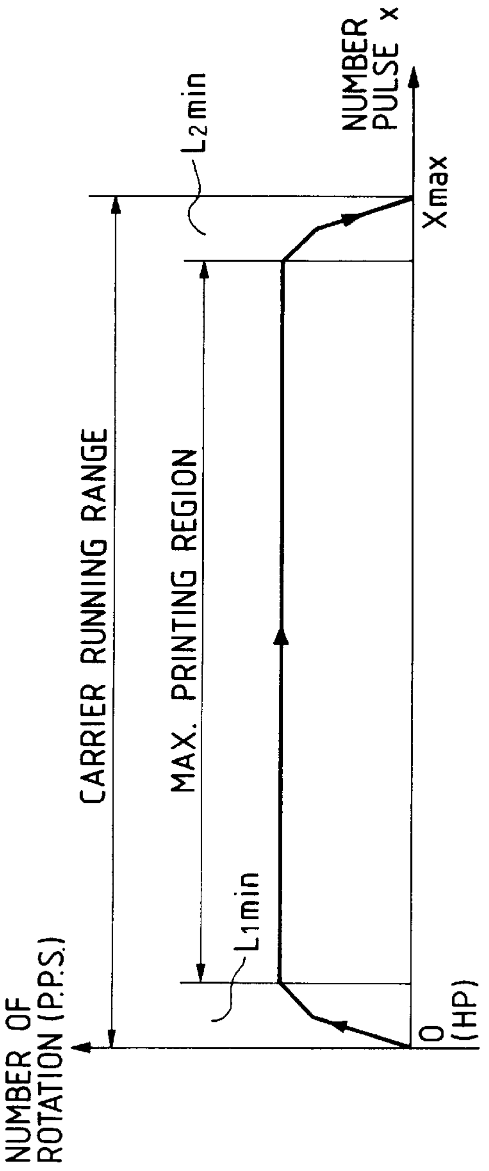
FIG. 16 is a diagram illustrating the change of speed of the carrier motor of FIG. 7 according to a drive control of a second preferred embodiment.

FIG. 16 is a diagram illustrating the change of the speed of the carrier motor 9 when printing on the whole of a maximum printing region. The width of the maximum printing region is the maximum printable width of the printing papers, e.g., the width of the A4 size. The acceleration curve is rapid over a distance ($L_{1min}$) between the recording home position and the max. printing region as compared with the conventional one.

The rapid acceleration curve consists of a most rapid portion and a comparatively gentle acceleration portion. Thereby, it is possible to reduce the change of speed in the max. printing region.

Also, a rapid deceleration curve is drawn over a distance ($L_{2min}$) between the max. printing region and the right end ($X_{max}$) of a carrier running range.

By selecting the rapid acceleration and rapid deceleration curves as above, not only the change of speed in the printing region but also the distances of the acceleration and deceleration areas can be reduced preferably.

In the second embodiment, the rapid acceleration curve consists of the two portions as above, but may consists of one portion (a train of curved lines partially including a straight portion or a straight line) or may have a linearly accelerated portion or an unaccelerated portion. Its reason is that more or less change of the speed in the end portions of the max. printing region will not be hindrance to ordinary printings as left and right margins are provided on printing papers in the ordinary printings.

Figure 17:
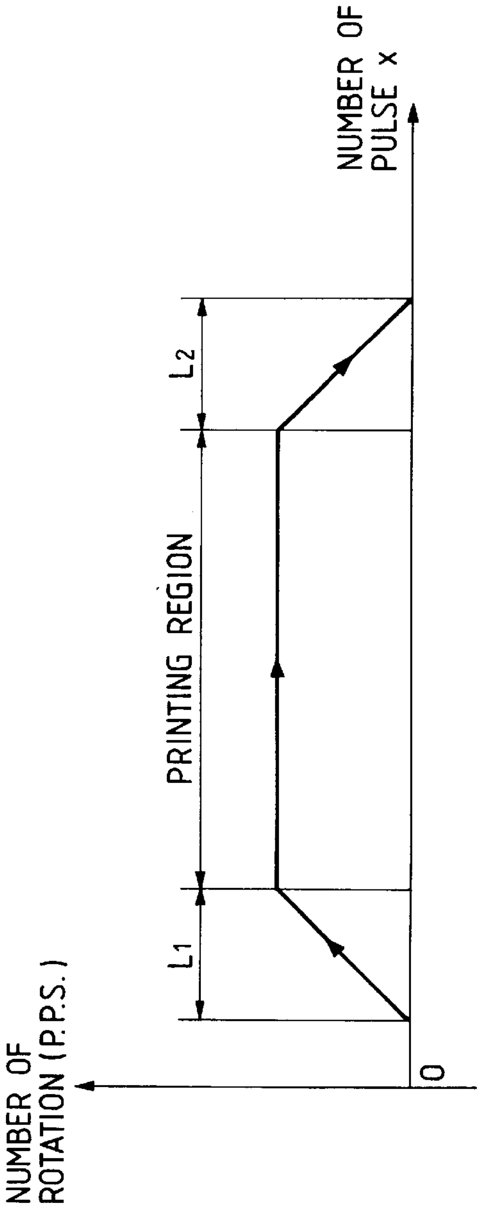
FIG. 17 is a diagram illustrating the change of speed of the carrier motor of FIG. 7 according to the second embodiment.

FIG. 17 is a diagram illustrating the change of speed of the carrier motor 9 when printing on a printing region whose width is equal to that of the B5 size. In this case, since there can be provided an acceleration area $L_1$ and a deceleration area $L_2$ the same as in the conventional printer before and behind the printing region, the acceleration and deceleration curves can be the same as conventional ones (normal acceleration and deceleration curves).

Next, it will be described a method of determining the acceleration curve of the carrier motor 9 in printing according to the second embodiment.

Figure 18:
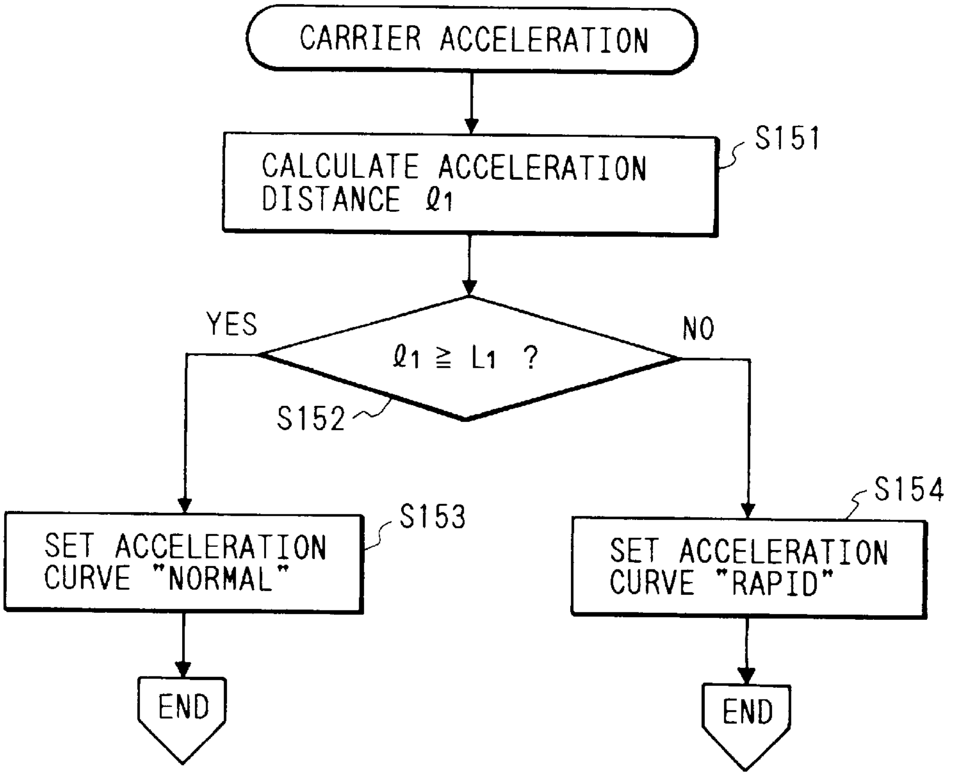
FIG. 18 is a flowchart illustrating a procedure of determining an acceleration curve of the carrier motor of FIG. 7 according to the second embodiment.

The CPU 37 determines the acceleration curve by a procedure as illustrated in FIG. 18.

First, in the step S151, it is calculated the acceleration distance $1_1$ (the number of pulses) between a present stopped position (the number of pulses) of the carrier and the next printing start position (the number of pulses).

Next, $1_1$ is compared with the normal acceleration distance $L_1$ in the step S152. Then, in the step S153, when $1_1$ is $L_1$ or more, the acceleration curve is set to be the normal acceleration curve thereby to complete the procedure.

In the step S152, when $1_1$ is less than $L_1$, the procedure goes to the step S154 and the acceleration curve is set to be the rapid acceleration curve thereby to complete the procedure.

Figure 19:
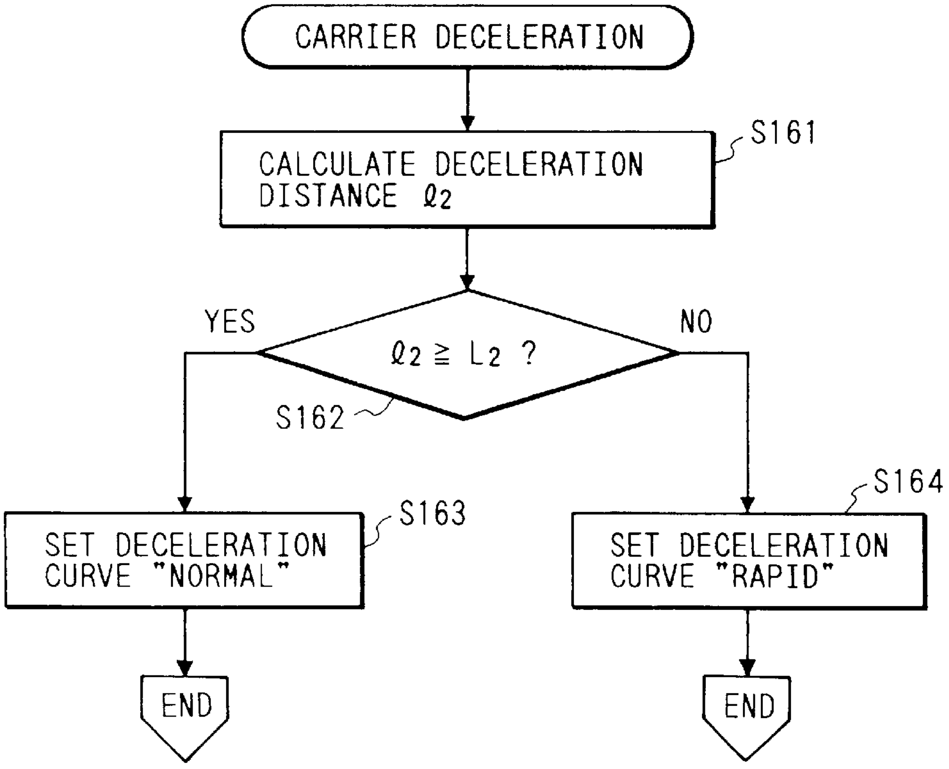
FIG. 19 is a flowchart illustrating a procedure of determining a deceleration curve of the carrier motor of FIG. 7 according to the second embodiment.

Also, the CPU 37 determines the deceleration curve by a procedure as illustrated in FIG. 19 during running of the carrier.

First, in the step S161, it is calculated the deceleration distance $1_2$ between the printing end position (the number of pulses) and the stop position $X_{max}$ of the carrier.

Next, $1_2$ is compared with the normal deceleration distance $L_2$ in the step S162. Then, in the step S163, when $1_2$ is $L_2$ or more, the deceleration curve is set to be the normal deceleration curve thereby to finish the procedure.

In the step S162, when $1_2$ is less than $L_2$, the procedure goes to the step S164 and the deceleration curve is set to be the rapid deceleration curve thereby to complete the procedure.

Figure 20:
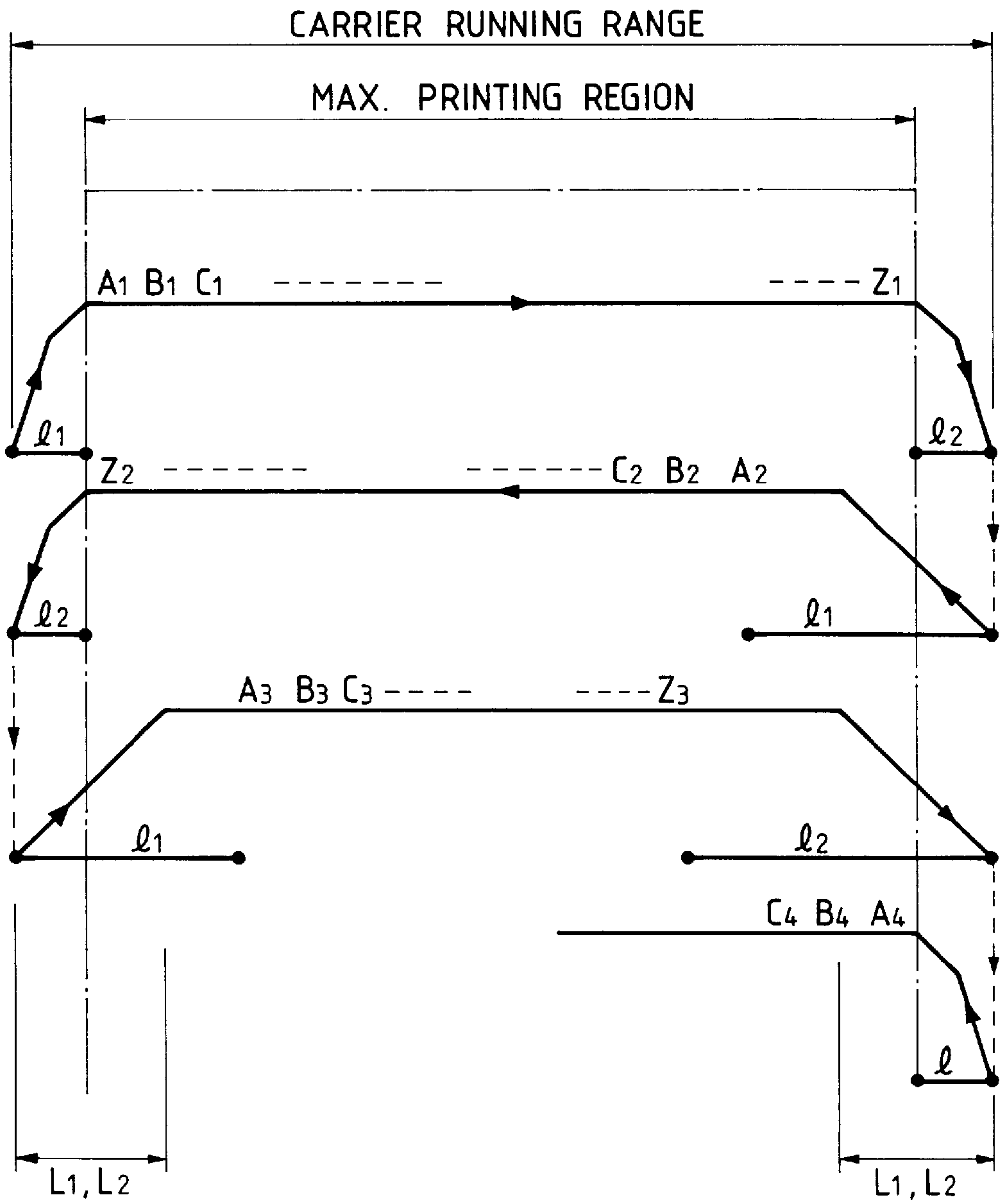
FIG. 20 is an explanatory view illustrating the change of speed of the carrier motor of FIG. 7 at the time of recording according to the second embodiment.

Now, it will be described an example of printing by selecting the acceleration and deceleration curves with respect to FIG. 20.

First, in printing a first line $A_1, B_1, C_1, \ldots, Z_1$, the printing is performed on the entire max. printing region, so that $1_1<L_1$ and $1_2<L_2$. Therefore, the rapid acceleration curve and the rapid deceleration curve are selected.

In printing a second line $A_2, B_2, C_2, \ldots, Z_2$, $1_1>L_1$ and $1_2<L_2$, so that the normal acceleration curve and the rapid deceleration curve are selected. In printing a third line $A_3, B_3, C_3, \ldots, Z_3$, $1_1>L_1$ and $1_2>L_2$, so that the normal acceleration curve and the normal deceleration curve are selected.

According to the second embodiment of the present invention as described above, the acceleration curve is determined in accordance with the distance between the present position of the carrier and the next printing start position and the deceleration curve is determined in accordance with the distance between the printing end position and the stop position of the carrier, so that the acceleration and deceleration control of the carrier can be performed in accordance with the actual printing range. As a result, the acceleration and deceleration areas for the carrier can be reduced as compared with the conventional recording apparatus contributing to lessening of the width of the ink jet recording apparatus.

Next, it will be described a drive control of the carrier motor 7 in FIG. 7 according to a third preferred embodiment with reference to FIGS. 21 to 27.

Figure 21:
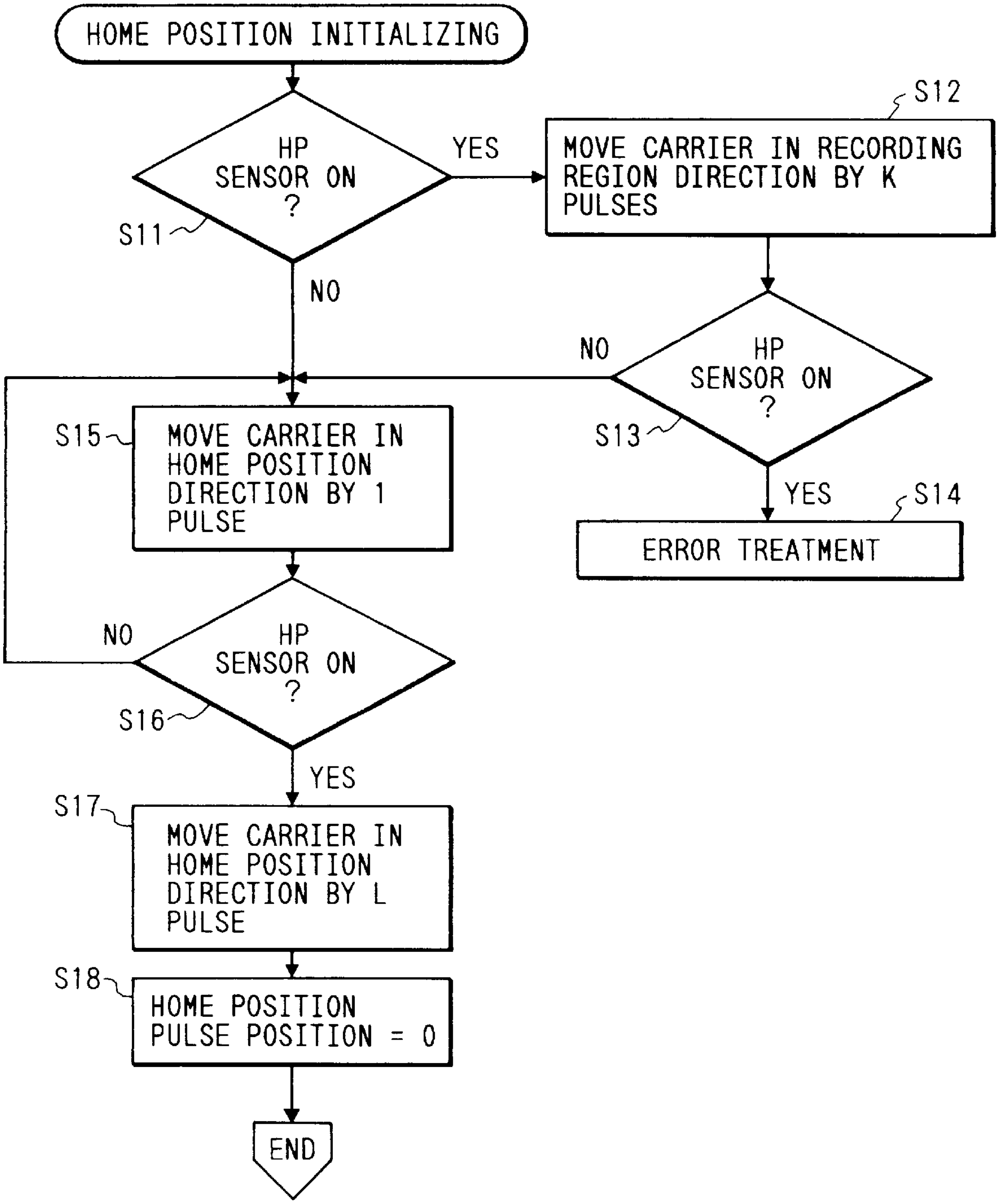
FIG. 21 is a flowchart illustrating an example of a home position initializing process of the carrier according to a drive control of the carrier motor in FIG. 7 of a third preferred embodiment.

Although printing is performed by the printer section 33 on the recording material (paper) 14 by means of the electric circuit in FIG. 7, it will be described first a home position initializing process of the carrier 1 and an abnormality judgment process from FIG. 21.

When the power source of the printer section 33 is turned on, the home position initializing process is executed in order to determine a reference position of the carrier 1. First, in the step S11, the CPU 37 judges whether the home position sensor (hereinafter called the HP sensor) 22 is on or off. When it is on, the procedure goes to the step S12, wherein K pulses are given to the carrier motor 9 to move carrier 1 in consideration of the length of the interrupting plate 1A in a printing region direction (the $X_1$ direction). Then, in the step S13, it is judged again whether the HP sensor is on or off. When it is off, the procedure goes to the step S15. When it is on, the abnormal condition of the conveying mechanism of the carrier 1 or the carrier motor 9 is presumed, so that a predetermined error treatment is performed in the step S14.

On the other hand, when the HP sensor 22 is off in the steps S11 and S13, in the step S15, the carrier 1 is moved by one pulse for the carrier motor 9 in a home position direction (the $X_2$ direction). Then, in the step S16, the on or off-condition of the HP sensor is judged and the one pulse drive operation is repeated until the HP sensor 22 is turned on. When the HP sensor 22 is turned on, the procedure goes to the step S17, wherein this position of the carrier 1 is memorized and the carrier 1 is further moved in the home position direction by L pulses and stopped. This stopped position is set to be the home position pulse position 0.

Figure 22:
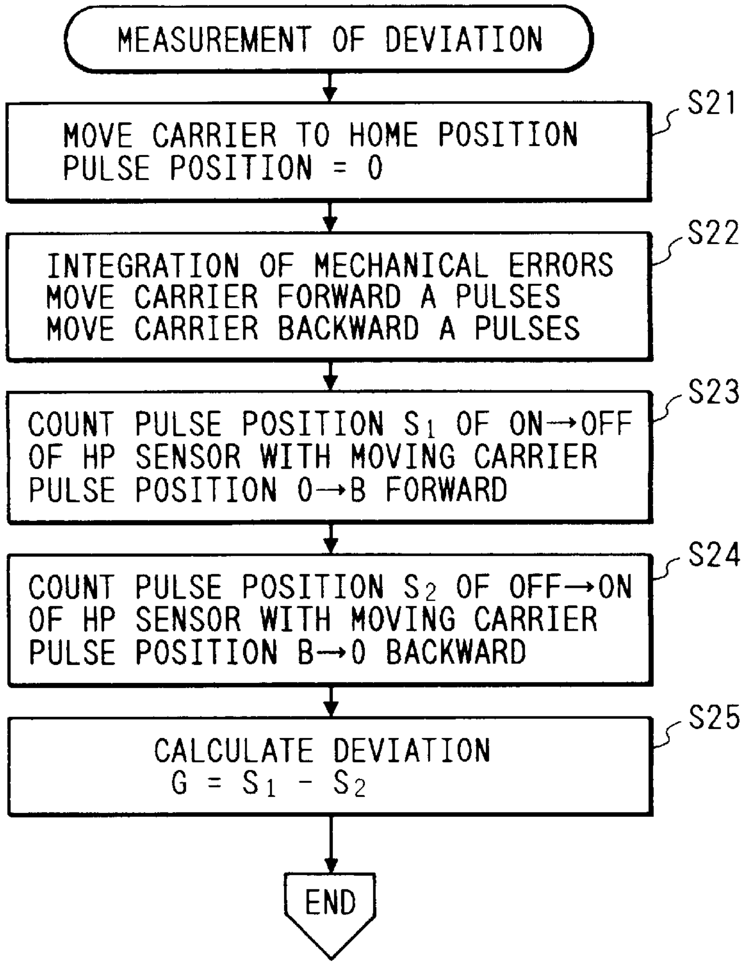
FIG. 22 is a flowchart illustrating an example of a process for measuring the deviation of the carrier in the third embodiment.

After having finished the above-described home position initializing process, a deviation G caused by the mechanical error of the carrier feeding mechanism is measured by a procedure in the flowchart as illustrated in FIG. 22. That is, after moving the carrier 1 to the home position pulse position, the carrier 1 is shifted in one direction of the mechanism error in the step S22. This is performed by moving the carrier 1 in a forward direction (the $X_1$ direction) by A pulses and thereafter moving the carrier 1 in a backward direction (the $X_2$ direction) by A pulses. Then, in the step S23, the carrier 1 is moved in the forward direction from the pulse position 0 till a limit position B of a carrier running range (refer to FIG. 23) one pulse after another and it is measured a pulse position $S_1$ where the HP sensor 22 is switched from the on-state to the off-state. Further, in the step S24, the carrier 1 is moved in the backward direction from the limit pulse position B similarly and it is measured a pulse position $S_2$ where the HP sensor 22 is switched from the off-state to the on-state. Then, in the step S25, the deviation G is obtained from the pulse positions $S_1$ and $S_2$ by the equation: $G=S_1-S_2$. The deviation G can be used as the correction for the recording position adjustment between the forward and backward runnings.

Then, recording is performed by the recording head 2 loaded on the carrier 1 by counting the number of drive pulses of the carrier motor 9 on the basis of the home position pulse position 0 to estimate the moving distance of the carrier 1 and controlling the recording start position or the like.

Figure 23:
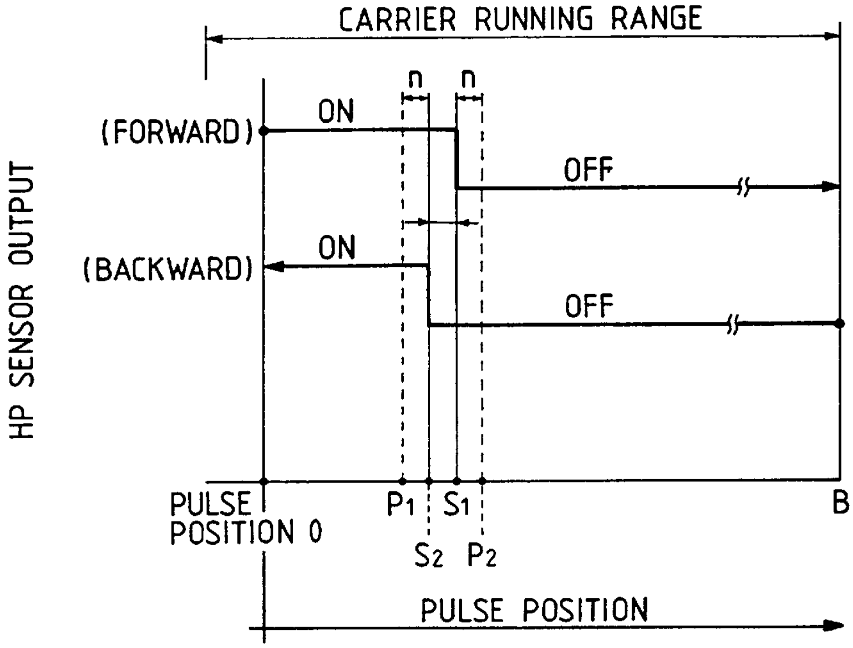
FIG. 23 is a time chart illustrating an example of a relationship between the output of the HP sensor with respect to the carrier and a predetermined range in the third embodiment.
Figure 24:
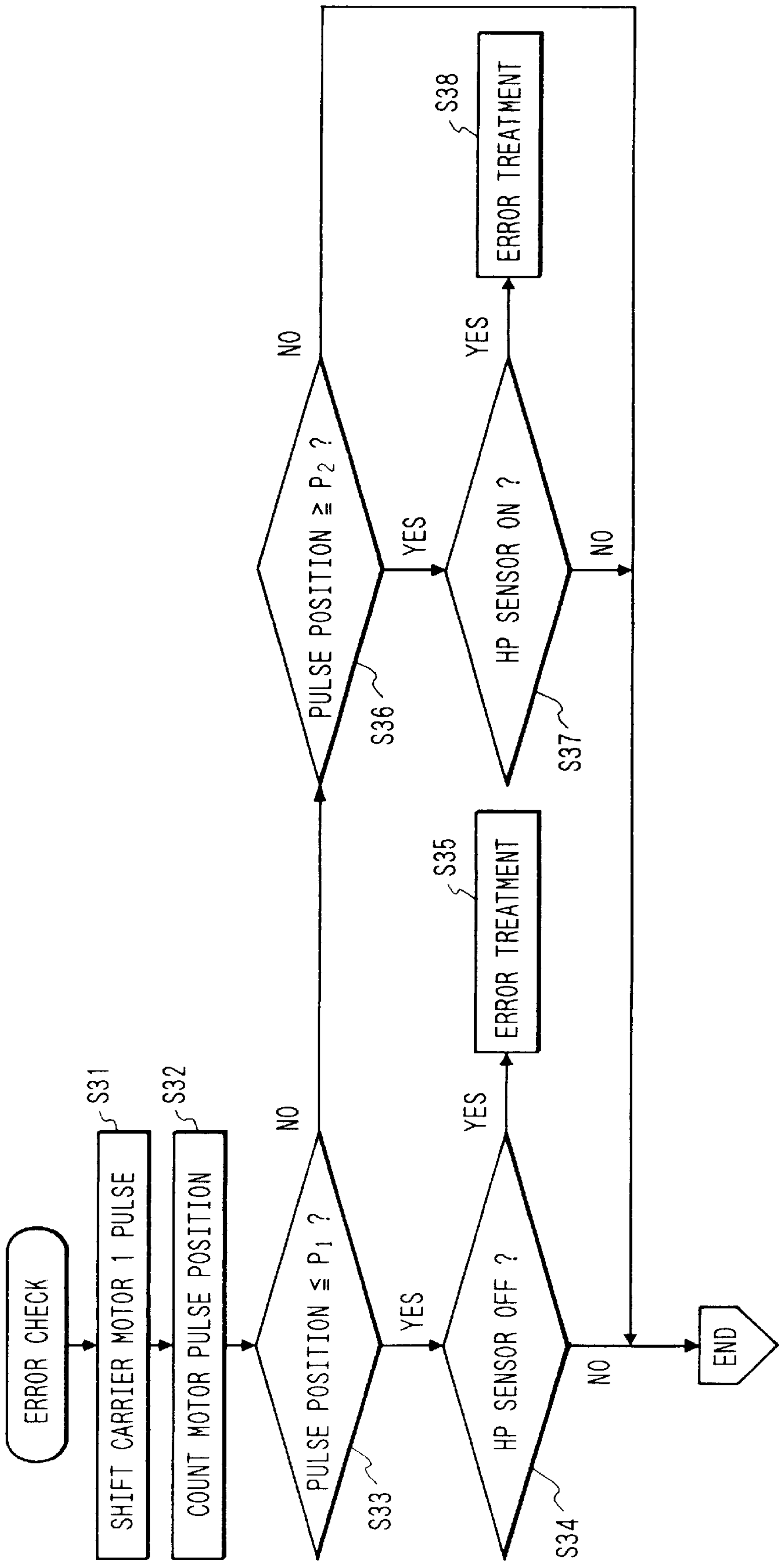
FIG. 24 is a flowchart illustrating an example of an error check process for the carrier in the third embodiment.

Next, it will be described a procedure of a carrier position abnormality judgment process (hereinafter called the error check) during running of the carrier 1 with reference to the time chart in FIG. 23 and the flowchart in FIG. 24.

In the step S31, the home position pulse position 0 is made as the reference and one drive pulse is sent to the carrier motor 9. The drive pulse is counted as a motor pulse position in the step S32. For example, the drive pulse is counted up in the forward running while counted down in the backward running. In the step S33 or step S36, it is judged whether the pulse position as counted above is larger than a lower limit $P_1$ or a higher limit $P_2$ of a predetermined range.

Now, the lower limit $P_1$ and the higher limit $P_2$ of the predetermined range will be described. As mentioned above, the output level of the HP sensor 22 is presumed to be switched at the pulse position $S_1$ in the forward running and at the pulse position $S_2$ in the backward running. These positions might be displaced owing to the mechanical error of the conveying mechanism for the carrier 1, the positional deviation of the rotor of the carrier motor, the hysteresis of the HP sensor 22, and the like, so that misjudgment might occur if judgment were conducted only based on the pulse positions $S_1$ and $S_2$. Then, in order to absorb these errors, predetermined extra ±n pulses are added to both sides of the deviation. G to determine a predetermined range. The lower and upper limit positions of this predetermined range is set to be $P_1$ and $P_2$ respectively.

In the step S33, a step position of the carrier motor 9 representing as estimated position of the carrier 1 is compared with the lower limit position $P_1$. When the step position is equal to or smaller than $P_1$, the procedure goes to the step S34 and it is judged whether the HP sensor is off or not. When it is on, it is a natural condition, so the error check routine is finished as normal. On the other hand, when the step position is smaller than the lower limit position $P_1$ and the HP sensor 22 is off, it is an unoccurable condition. Then, it is judged as abnormal and an error treatment is performed in the step S35.

Also, when the step position is larger than the lower limit position $P_1$, the procedure goes to the step S36 and it is judged whether the step position is larger than the upper limit position $P_2$. Then, when it is larger, the procedure goes to the step S37 and it is judged whether the HP sensor 22 is on or not. When it is off, it is a natural condition and the error check routine is finished. However, when it is on, it is an unoccurable condition. Then, it is judged as abnormal similarly to the above and an error treatment is performed in the step S38.

When the step pulse position is smaller than the upper limit position $P_2$ in the step S36, that is, when the step pulse position is within the predetermined range between the lower limit position $P_1$ and the upper limit position $P_2$, the error check routine is finished with no judgment. Thus, when the step position is within the predetermined range including the pulse positions $S_1$ and $S_2$ where misjudgments might occur, thus the judgment is stopped and reliability of the judgment is guaranteed.

In the above-described third embodiment, the abnormality or normality judgment is executed outside the predetermined range in comparison with the output level condition of the HP sensor 22, but may be executed by checking whether the output level of the HP sensor 22 is switched or not within the predetermined range between the upper and lower limit positions $P_1$ and $P_2$. In this case, when the output level of the HP sensor 22 is not switched within the predetermined range, it is judged as the abnormal condition.

Figure 25:
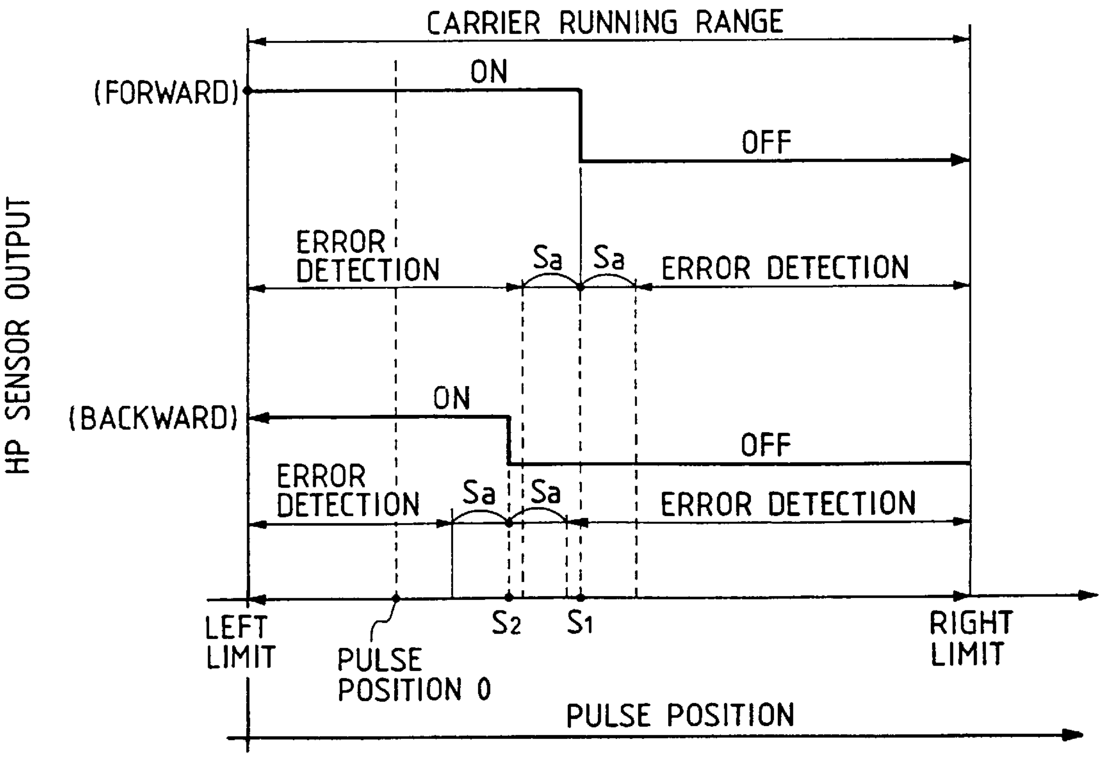
FIG. 25 is a time chart illustrating another example of a relationship between the output of the HP sensor with respect to the carrier and predetermined ranges in the third embodiment.
Figure 26:
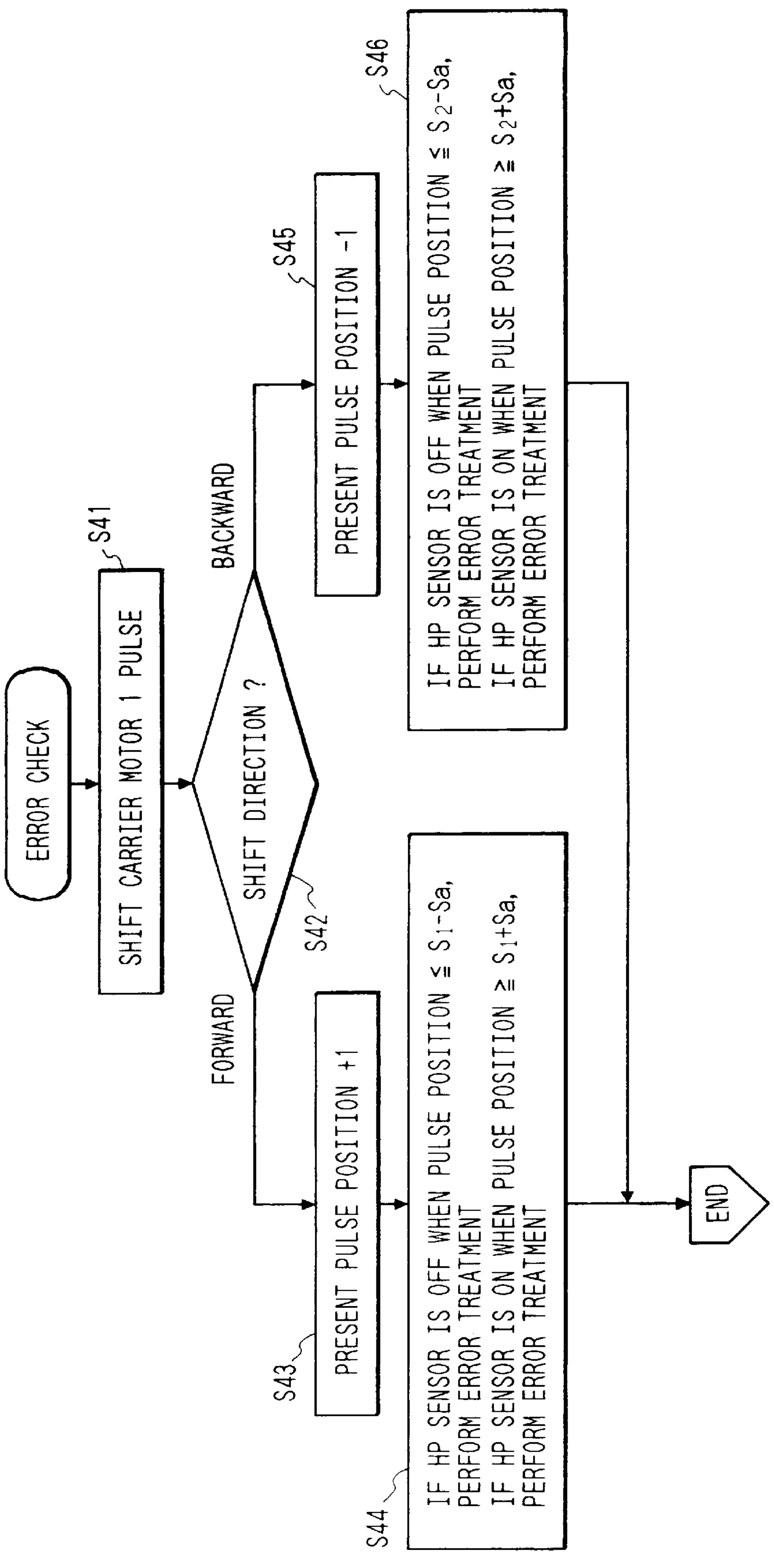
FIG. 26 is a flowchart illustrating another example of an error check process for the carrier in the third embodiment.

Further, it will be described another procedure of the abnormality judgment process according to the third embodiment of the present invention with reference to the time chart in FIG. 25 and the flowchart in FIG. 26.

Although the predetermined range is determined by adding the extra ±n pulses to both sides of the deviation G in the above procedure of the abnormality judgment process, extra ±Sa pulses are respectively added to the pulse positions $S_1$ and $S_2$ to determine a predetermined range for the forward running and a predetermined range for the backward running in this procedure, whereby the accuracy of the error check can be improved.

First, in the step S41, one drive pulse is sent to the carrier motor 9. Then, in the step S42, a shift direction of the carrier motor 9 is judged. When it is the forward direction, the procedure goes to the step S43, wherein one pulse is added to the present pulse position. Next, in the step S44, when the pulse position is equal to or smaller than $(S_1-S_a)$ and the HP sensor 22 is off or when the pulse position is equal to or larger than $(S_1+S_a)$ and the HP sensor 22 is on, an error treatment is executed. However, no judgment is carried out within the predetermined range for the forward running including the pulse position $S_1$.

Also, when the backward direction is judged in the step S42, the procedure goes to the step S45, wherein one pulse is substracted from the present pulse position. Then, in the step S46, when the pulse position is equal to or smaller than $(S_2-S_a)$ and the HP sensor 22 is off, or when the pulse position is equal to or larger than $(S_2+S_a)$ and the HP sensor 22 is on, an error treatment is performed. However, no judgment is performed in the predetermined range for the backward running including the pulse position $S_2$.

Figure 27:
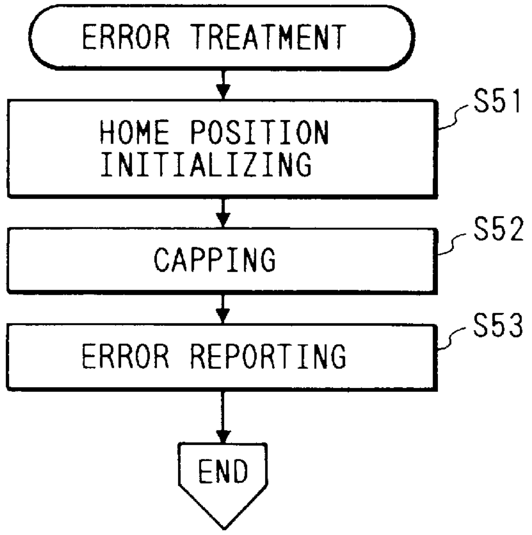
FIG. 27 is a flowchart illustrating an example of the error treatment for the carrier in the third embodiment.

An example of the above-mentioned error treatment is illustrated in the flowchart in FIG. 27.

First, in the step S51, the above-described home position initializing process is performed. In the step S52, the recording head 2 is capped and then, an error reporting is performed in the step S53.

According to the third preferred embodiment of the present invention, as is apparent from the above description, when judging the abnormal position of the carrier, misjudgment can be prevented and the judgment can be executed with high reliability.

The present invention is especially effective in recording heads and recording apparatuses having energy generating means (e.g., electrothermal conversion elements, laser beams or the like) for generating thermal energy, which is utilized to discharge ink by changing its condition. According to this system, recording can be carried out at high density and more minutely.

Its representative structure and principle are preferably selected from those disclosed in U.S. Pat. Nos. 4,723,129 and 4,740,796. This system is applicable to both the on-demand type and the continuous type. In the on-demand type, to an electrothermal conversion element disposed correspondingly to liquid pathway and sheet for holding liquid (ink) is applied at least one drive signal corresponding to printing information for imparting rapid rise of temperature exceeding the nuclear boiling, thereby the electrothermal conversion element generating thermal energy, causing the film boiling to occur at a thermal acting surface of the recording head. As a result, a bubble can be formed in the liquid (ink) correspondingly to the one drive signal. Therefore, the above system is more effective to the on-demand type. The liquid (ink) is discharged as at least one droplet by the growth and contraction of the bubble. It is more preferable to make the drive signal in the shape of a pulse, as the growth and contraction of the bubble can be performed instantly and appropriately, enabling especially responsive discharge of the liquid (ink). The drive signal in the shape of a pulse is desirably selected from that disclosed in U.S. Pat. Nos. 4,463,359 and 4,345,262. Also, it is possible to print more preferably when adopting the condition of the temperature rise rate at the thermal acting surface disclosed in U.S. Pat. No. 4,313,124.

Regarding the structure of the recording head, the present invention is applicable not only to those (straight liquid pathway or rectangular liquid pathway) in the above U.S. Patents, but also to a structure having an energy acting portion disposed on a bent area as disclosed in U.S. Pat. Nos. 4,558,333 and 4,459,600. The present invention is also effective in a structure having a common slit as a discharge portion corresponding to a plurality of electrothermal conversion elements as disclosed in Japanese Patent Laid-Open No. 59-123670 or in a structure having an opening formed correspondingly to a discharge portion so as to absorb pressure wave of thermal energy, as disclosed in Japanese Patent Laid-Open No. 59-138461. In short, whatever type of recording head is utilized, recording can be performed surely and efficiently according to the present invention.

Also, the present invention is applicable to a full line type recording head having a length corresponding to the maximum width of a recording medium which can be recorded by the recording apparatus. As such a recording head, a plurality of recording heads may be combined together to fill the length or an integrally formed one recording head may be utilized.

Further, the present invention is effective in other serial type recording heads such as a recording head fixed to a recording apparatus body, a chip type recording head to be replaceably loaded in a recording apparatus body to enable an electrical connection with the recording apparatus body and ink supply from the recording apparatus body or a cartridge type recording head provided integrally with an ink tank.

Also, if discharge recovery means or preliminary supplementary means for the recording head are added to the recording apparatus of the present invention, the effect of the present invention can be more stabilized. In concrete terms, there are capping means, cleaning means, pressuring or sucking means, preliminary heating means formed of electrothermal conversion elements, another heating elements or a combination of these and preliminary discharge means for performing discharge independently of recording.

Further, concerning the kind and the number of recording heads, e.g., a plurality of recording heads may be provided correspondingly for a plurality of inks having different colors and densities, besides one recording head is provided for one monochromatic ink. That is, the present invention is applicable to a recording apparatus having at least one color recording mode for multiple colors or full colors by mixed colors in addition to a monochromatic recording mode for a main color such as black. In this case, the recording head may be an integrally formed recording head or a combination of a plurality of recording heads.

Although the ink is described as the liquid in the above embodiments of the present invention, the ink may be the one which is solidified in room temperature or below and softened or liquefied in room temperature. In the ink jet printing method, generally, ink itself is controlled by the regulation of temperature in the range of 30° C. to 70° C. so as to keep the tackness of the ink in a stable discharging range, so the ink may be the one which is liquefied at the time of application of a recording signal. In addition, in order to prevent vaporization of ink and temperature rise due to thermal energy by utilizing the energy so as to change the ink from a solid condition into a liquid condition, the ink may be the one which is solidified in a left state and liquefied by heating. In short, the present invention is applicable to inks having characteristic wherein the inks are liquefied by application of heat in accordance with recording signals and then discharged as liquid ink droplets or liquid ink droplets which start solidifying as soon as they reach recording mediums. Such inks may be positioned to face electrothermal conversion elements with the inks held in recesses or holes of a porous sheet, as disclosed in Japanese Patent Laid-Open Nos. 54-56847 and 60-71260, in a solid or liquid condition. In the present invention, the above-mentioned film boiling method is most effective for the above inks.

Furthermore, the recording apparatus of the present invention may be a copying machine combined with a reader or a facsimile apparatus having transmitting and receiving functions other than an image output device of an information processing apparatus such as a computer.

What is claimed is:

1. A recording apparatus comprising:

a carriage having a recording head loaded thereon;

a step motor for shifting said carriage: and control means for counting drive pulses for driving said step motor, comparing a counted value with a reference value and changing a drive mode of said step motor in accordance with whether the counted value exceeds the reference value, wherein said reference value corresponds to the number of drive pulses at the time when said carriage has been moved to a home position, wherein if said counted value is below said reference value, said drive mode of said step motor is set to a micro step drive mode, and when said counted value exceeds said reference value, said drive mode of said step motor is set to a half-step excitation drive mode.

2. A recording apparatus as defined in claim 1, wherein said recording head is an ink jet head and said carriage provided with said ink jet head moves between a printing region and a recovery system region, wherein if said counted value is below said reference value said carriage is in the recovery system region of said ink jet head, and when said counted value exceeds said reference value said carriage is in the printing region of said ink jet head.

3. A recording apparatus comprising:

a carriage having a recording head loaded thereon;

a step motor for shifting said carriage; and control means for determining a distance between a present position of said carriage and a next recording start position thereof and a distance between a recording end position thereof and carriage stop position, and comparing a counted value of drive pulses for driving said step motor to shift said carriage the distance between the present position of said carriage and the next recording start position and the distance between the recording end position and the carriage stop position with a reference value which corresponds with pulse numbers necessary for performing a regular acceleration process and a regular deceleration process of said carriage, said control means changing one of an acceleration characteristic and a deceleration characteristic of said step motor in accordance with whether the value exceeds the reference value or not, said control means sets one of said acceleration characteristic and said deceleration characteristic to a first characteristic when said value exceeds said reference value, and said control means sets one of said acceleration characteristic and said deceleration characteristic to a second characteristic when said value is below said reference value, wherein said control means sets the acceleration characteristic when said value corresponds to the distance between the present position of said carriage and the next recording start position and sets the deceleration characteristic when said value corresponds to the distance between the recording end position and the carriage stop position, and wherein said control means controls said step motor to shift said carriage at a constant speed while the recording head records.

4. A recording apparatus comprising:

a carriage having a recording head loaded thereon;

a step motor for shifting said carriage;

detecting means for detecting whether said carriage is at a predetermined position;

estimating means for counting drive pulses supplied to said step motor and estimating a position of said carriage in accordance with a counted value of drive pulses; and control means for determining whether or not the position of said carriage estimated by said estimating means is within a predetermined range, the predetermined range being represented by pulse numbers corresponding to a certain range, including the predetermined position detected by said detecting means, in which a detection error can be determined, said control means performing an error processing for determining whether an error in shifting said carriage exists when said carriage is not within the predetermined range and terminating the error processing when said carriage is within the predetermined range.

5. A recording apparatus as defined in claim 4, wherein said recording head is an ink jet head and has a plurality of electrothermal conversion elements and ink is discharged selectively from a plurality of discharge openings each corresponding to said plurality of electrothermal conversion elements by utilizing film boiling generated in the ink by means of thermal energy applied by each of said electrothermal conversion elements.

* * * * *

UNITED STATES PATENT AND TRADEMARK OFFICE
CERTIFICATE OF CORRECTION

PATENT NO. : 5,861,726 Page 1 of 2

DATED : January 19, 1999

INVENTOR(S) : YOSHIO UCHIKATA, ET AL.

It is certified that error appears in the above-identified patent and that said Letters Patent is hereby corrected as shown below:

On title page, item
[56] References Cited,
U.S. Patent Documents, "Hashimato" should read --Hashimoto--.

COLUMN 1,
Line 60, "then" should read --therefore--.

COLUMN 3,
Line 46, "leads" should read --lead--.

COLUMN 5,
Line 22, "it" should read --there--;
Line 36, "receives" should read --receive--; and
Line 41, "sandwitched" should read --sandwiched--.

COLUMN 6,
Line 22, "each" should read --relative to each--; and
Line 47, "It" should read --There--.

COLUMN 9,
Line 19, "there with." should read --therewith.--.

COLUMN 10,
Line 56, "consists" (second occurrence) should read --consist--.

CERTIFICATE OF CORRECTION

PATENT NO. : 5,861,726

DATED : January 19, 1999

INVENTOR(S) : YOSHIO UCHIKATA, ET AL.

It is certified that error appears in the above-identified patent and that said Letters Patent is hereby corrected as shown below:

COLUMN 11,
Line 66, "motor 7" should read --motor 9--.

COLUMN 13,
Line 20, "is" should read --are--; and
Line 23, "as" should read --an--.

COLUMN 14,
Line 20, "substracted" should read --subtracted--; and
Line 54, "nuclear" should read --nucleate--.

COLUMN 15,
Line 61, "tackness" should read --thickness--; and
Line 67, "a left" should read --an unused--.

Signed and Sealed this

Second Day of November, 1999

Attest:

Q. TODD DICKINSON

*Attesting Officer*

*Acting Commissioner of Patents and Trademarks*